United States Patent [19]
Anderson et al.

[11] Patent Number: 5,963,417
[45] Date of Patent: Oct. 5, 1999

[54] ELECTROCHEMICAL CAPACITOR

[75] Inventors: Marc A. Anderson; Kuo-Chuan Liu, both of Madison, Wis.; Charles M. Mohr, Idaho Falls, Id.

[73] Assignees: Wisconsin Alumni Research Foundation, Madison, Wis.; Lockheed Martin Idaho Technologies, Idaho Falls, Id.

[21] Appl. No.: 08/748,558

[22] Filed: Nov. 8, 1996

Related U.S. Application Data

[60] Provisional application No. 60/006,417, Nov. 9, 1995.
[51] Int. Cl.$^6$ .............................. H01G 9/00; H01G 9/02
[52] U.S. Cl. ......................... 361/503; 361/504; 361/508; 361/528; 29/25.03; 429/218
[58] Field of Search ..................................... 361/502–504, 361/508–509, 512, 516, 523–525, 528–529, 532; 29/25.03; 252/62.2; 429/40, 44, 46, 128–129, 188, 209, 218

[56] References Cited

U.S. PATENT DOCUMENTS 5,469,325  11/1995  Evans ..................................... 361/526

OTHER PUBLICATIONS

Bullard et al., "Organization Principles of the Ultracapacitor", *IEEE Transactions of Magnetics*, 25(1): 102–106 (1989).

Kohler et al., "Metal–Carbon Composite Electrodes from Fiber Precursors: Electrochemical Characterization of Stainless Steel–Carbon Structures", *J. Electrochem. Soc.*, 137(6):1750–1757 (1990).

Liu et al., "Porous Nickel Oxide Films for Electrochemical Capacitors" in *Materials for Electrochemical Energy Storage and Conversion Batteries, Capacitors and Fuel Cell*, edited by D.H. Dougherty, B. Vyas, J.R. Huff (Mater. Res. Soc. Symp. Proc., 393, Pittsburgh, PA) 427–432 (1995).

Liu et al., "Porous Nickel Oxide/Nickel Films for Electrochemical Capacitors", *J. Electrochem. Soc.*, 143 (1): 124–130 (1996).

Liu et al., "Ni$_x$O/Ni Composite Thin Films for Electrochemical Capacitors", in *Electrochemical Capacitors*, edited by F.M. Delnick and M. Tomkiewicz (The Electrochemical Society Proceedings, PV95–2, Pennington, NJ) 68–77 (1996).

Liu et al., "Evaluation of Current Collectors in Nickel Oxide Based Electrochemical Capacitors", in *Electrochemical Capacitors*, edited by F.M. Delnick and M. Tomkiewicz (The Electrochemical Society Proceedings Series, PV95–29m Pennington, NJ) 78–85 (1996).

Mayer et al., "The Aerocapacitor; An Electrochemical Double–Layer Energy–Storage Device", *J. Electrochem. Soc.*, 140(2): 446–451 (1993).

Ranstrick et al., "Electrochemical Capacitors" in *Electrochemistry of Semiconductors and Electronics Processes and Devices*, edited by J. McHordy, Noyes Publications, 297–355 (1992).

Rauh, A. David, "High Rate Electrodes for Pulse Power", *U.S. Army Workshop on Capicitors and Batteries for Pulse Power Applications* (1987).

Sanada et al., "Electric Double Layer Capacitor "Super Capacitor"", *NEC Research & Development*, 55: 21–28 (1979).

Sarangapni et al., "Advanced Double Layer Capacitors", *J. Power Sources*, 29: 355–364 (1990).

Tanahashi et al., "Electrochemical Characterization of Activated Carbon–Fiber Cloth Polarizable Electrodes for Electric Double–Layer Capacitors", 137 (10): 3052–3057 (1990).

*Primary Examiner*—Kristine Kincaid
*Assistant Examiner*—Anthony Dinkins
*Attorney, Agent, or Firm*—Quarles & Brady LLP

[57]  ABSTRACT

An inexpensive porous metal oxide material having high surface area, good conductivity and high specific capacitance is advantageously used in an electrochemical capacitor. The materials are formed in a sol-gel process which affords control over the properties of the resultant metal oxide materials.

21 Claims, 15 Drawing Sheets

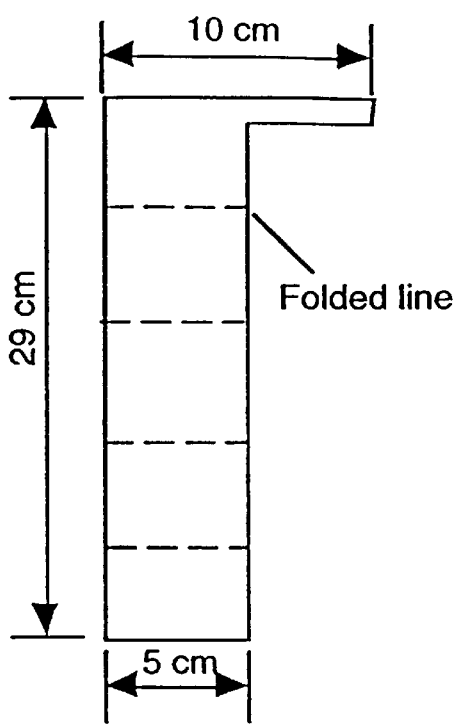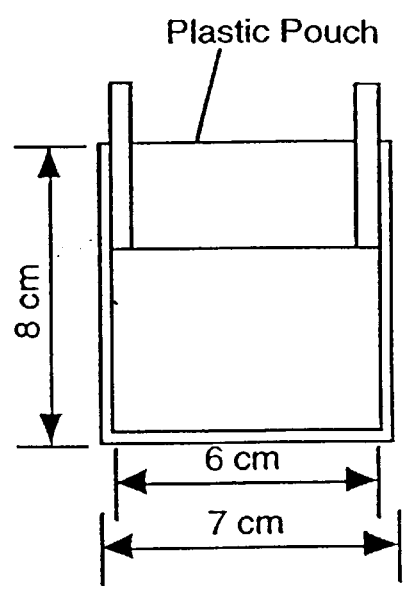
FIG 3a
FIG 3b

ELECTROCHEMICAL CAPACITOR

CROSS-REFERENCE TO RELATED APPLICATIONS

This application claims the benefit of Provisional Patent Application No. 60/006,417 filed Nov. 9, 1995.

STATEMENT REGARDING FEDERALLY SPONSORED RESEARCH OR DEVELOPMENT

Not applicable.

BACKGROUND OF THE INVENTION

A capacitor is a device that stores energy in the form of charges of equal and opposite signs on two plates, separated by a non-conducting medium. The capacitance (C) of such a device is given by the following relation:

$$C = \frac{q}{V} = \epsilon \frac{A}{d},$$

where q is the charge on each plate, V is the potential difference between the plates, A is the surface area of each plate, $\epsilon$ is the dielectric constant of the medium separating the plates, and d is the distance between the plates. Furthermore, the potential energy (U) stored in a capacitor is given by:

$$U = \frac{1}{2}CV^2.$$

These simple relations indicate that in order to have a high energy capacitor, one requires plates with high surface area and very close spacing. If two flat metal plates that each have an area of 2 m$^2$ are separated by 1 mm in a vacuum, the associated capacitance is only $1.75 \times 10^{-8}$ farads (F). Thus, the farad is a large value of capacitance. A more practical measure of capacitance is the microfarad ($\mu$F).

Electrochemical capacitors store charge at the interface between a solid electrode and an electrolyte through physical-chemical interactions between the electrode and the ions in the electrolyte. Raistrick, *Electrochemical Capacitors*, in "Electrochemistry of Semi-conductors and Electronics Processes and Devices," Eds. J. McHardy and F. Ludwig, Noyes Publications, 1992 (incorporated herein by reference in its entirety), reviews the history and properties of electrochemical capacitors. Only a brief summary of the nature of electrochemical capacitors follows. Reference to Raistrick is recommended.

When ions are present in a system that contains an interface, there will be a variation in the ion density near that interface. When a potential difference is applied across two electrodes in a solution, a charge builds up on the surface of each electrode. For a metal electrode, this charge resides on a very thin layer (less than 0.1 Å thick) at the metal surface. Due to electrostatic interactions, ions in the solution migrate to the electrode to counterbalance the charge on the electrode. The excess charge density at the interface can be ascribed to two parallel imaginary planes which contain opposite charge. These two planes are called the electric double layer. Each layer corresponds to a plate of the double layer capacitor. Some ions that can be specifically adsorbed on the surface of the electrode are associated with a plane called the inner Helmholtz plane (IHP) which represents the position of these ions. The solvated ions can only approach the surface to a distance referred to as the outer Helmholtz plane (OHP). Since either of these layers are extremely close to the surface (on the order of Angstroms, $10^{-10}$ m), typical capacitance values for these electrolytic capacitors are 10–50 $\mu$F/cm$^2$ of electrode surface. Thus, the capacitance of this system is on the order of $10^7$ times greater than that of a traditional parallel plate capacitor with the same surface area.

Electrochemical ultracapacitors, based on high surface area carbon electrode materials and a variety of electrolytes, have been the most studied and commercially developed systems. High porosity carbon, usually in the form of activated carbon or carbon black that is immersed in an aqueous or non-aqueous electrolytic solution, has a very high capacitance due to its large specific surface area. Tanahashi et al., "Electrochemical Characterization of Activated Carbon-Fiber Cloth Polarizable Electrodes for Electric Double-Layer Capacitors," *J. Electrochem. Soc.*, 137: 3052–7 (1990), showed that an activated carbon fiber cloth (ACFC) electrode can yield a differential capacitance of 113 F/g as measured by cyclic voltametry. Other research has shown that the ACFC can achieve a specific capacitance of 20–32 F/g in solid state or organic electrolytes. Mayer et al., "The Aerocapacitor: An Electrochemical Double-Layer Energy-Storage Device," *J. Electrochem. Soc.*, 140:446–51 (1993) developed an aerogel of carbon with a specific capacitance on the order of several tens of farads per gram. Most recent studies show that the specific capacitance of the carbon electrode can be as high as about 400 F/g.

The double-layer charging process may be regarded as taking place without complete charge-transfer to or from ionic species either in the solution or adsorbed at the interface. On the other hand, specifically adsorbed species undergo chemical interaction with the electrode and some degree of charge transfer between the metal or metal oxide and the adsorbate occurs. Some of these specifically adsorbed species undergo a Faradaic charge transfer process upon adsorption on the surface of the electrode. Examples of this type of reaction involve electrosorption of protons at noble metal surfaces (e.g., Platinum). Other reactions include reactions at thermally prepared RuO$_2$ and IrO$_2$ films of both a proton and an electron.

The differential capacitance associated with electrosorption processes is often called a "pseudocapacitance," $C_{ads}$, which can be expressed as $\partial q/\partial E = q_0(\partial \theta/\partial E)$, where $\theta$ is the fractional surface coverage by the adsorbed species, $q_0$ is the charge associated with the adsorption of a monolayer, and E is the potential applied on the electrode. This pseudocapacitance or "Electrosorption Capacitance" is reviewed in much greater detail in Raistrick.

Depending upon the materials, either the electric double layer or the electrosorption of ions at the interface, or both, can contribute to the storage of a tremendous amount of charge when a high specific surface area electrode is used. High surface area electrochemical capacitors can store higher charge than conventional capacitors.

Raistrick also graphically illustrated the relationship between specific power (kW/kg) and specific energy (kJ/kg) for conventional capacitors and batteries. While batteries have relatively large energy storage capability, their specific power output is relatively low. Thus, batteries are useful when sustained low power output is required. In contrast, conventional capacitors cannot store as much energy as batteries but can put out very high power levels for short times. Electrochemical capacitors present a hybrid between batteries and conventional capacitors in that they deliver higher peak power than batteries and yet have a higher energy storage capacity than conventional capacitors.

This attribute makes electrochemical capacitors potential candidates for electric vehicles and other devices that can provide sufficient power to meet the short-term heavy power demands often encountered by electric devices. Electrochemical capacitors can also serve as back-up energy sources in integrated electronics.

Two types of materials, carbon and oxides, are applied in electrochemical capacitors. Sohio Engineered Materials Company has produced a carbon-based capacitor that provides up to two farads per cubic inch of the device. This capacitor has 100 to 500 times the energy density of an aluminum electrolytic capacitor of similar capacitance and voltage. Other companies make carbon-based materials as well.

An electrochemical capacitor based upon oxide materials, namely $RuO_2$, is marketed by Pinnacle. See, Bullard, et al., "Operating Principles of the Ultracapacitor," IEEE Transactions on Magnetics, 25:102 (1989). As noted by Raistrick, comparatively little research has focused on oxide systems, possibly because of the high cost of $RuO_2$ which will limit the application of $RuO_2$ electrochemical capacitors, even if electrosorption on the surface of $RuO_2$ offers otherwise excellent charge storage capabilities.

Many transition metal oxides are electrochemically active and it has been envisioned that metal oxides can be used as electrodes in electrochemical capacitors, although Raistrick indicated that they are more justifiably considered battery materials, because the chemistry of these metal oxide materials has traditionally been thought to relate to the bulk of the materials, rather than to their surfaces. Examples include manganese oxide, nickel oxide, vanadium oxide, tungsten oxide, cobalt oxide, chromium oxide and molybdenum oxide. The charge densities of various oxide systems, calculated from the electrochemical reactions of these oxides, and based on their bulk electrochemical reaction in batteries are listed in the Raistrick review. These charge densities provide some indication of the energy-storage capability of a 'capacitor' constructed from these materials.

There is one report of the use of a highly dispersed, thin electrode of a number of oxides, including $VO_x$, $IrO_x$, $RuO_x$ and NiO, and organic polymers, in a multilayer bipolar pulse power battery/capacitor configuration fabricated by vacuum and electrochemical deposition techniques (Rauh, D., "High Rate Solid Electrodes for Pulsed Power," in *Proc. U.S. Army Workshop on Capacitors and Batteries for Pulse Power Applications*, Laboratory of the U.S. Army, LABCOM, Asbury Park, N.J., Nov. 17–18 (1987)). However, Rauh noted the limited electronic conductivity over the entire potential range of xerogel-based materials, especially NiO, polypyrrole, and $IrO_2$, and less so for $RuO_2$.

Also, a patent to Elliot and Huff (U.S. Pat. No. 3,317,349; issued May 2, 1967) concerned the use of oxides in capacitors. Wang, et al., "Preparation of Nickel Oxide Films by Sol-Gel Process," *J. Ceramic Society of Japan*, 101:223–5 (1993) reported the production of a nickel oxide film through a sol-gel process using an organic solvent (i.e., ethylene glycol). Hu et al. (1993) demonstrated that a nickel oxide film composed of fine particles displays better electrochromic properties than a film with homogenous morphology, and suggested that the grain boundaries provide a channel to enhance surface redox reactions which enhance the electrochromic effect.

It would be desirable to produce and use an inexpensive electrochemical capacitor having the desired capacitance and pseudocapacitance properties to provide very high power output for short periods of time coupled with rapid and efficient recharge.

BRIEF SUMMARY OF THE INVENTION

The invention is summarized in that an electrochemical capacitor that meets the needs of the art includes an active electrode formed of irregularly or randomly packed nano-sized transition metal oxide or metal grains (primary particles of 2–100 nm in diameter (mean), secondary particles in the range of 3–1000 nm in diameter (mean)) having a porosity in the range of 10% to 80%, a mean pore size of between 0.5 nm and 20 nm in diameter, and an open secondary structure. The materials are not dense films but rather have a highly porous secondary structure and high surface area accessible to the electrolyte, which results from the random packing of the grains. The surface area of these materials is in the range of 30–800 $m^2/g$, preferably in the range of 50–400 $m^2/g$, more preferably in the range of 100–300 $m^2/g$. The electrochemical capacitors of the present invention have conductivity in the range of $10^{-5}$ per ohm-cm to $10^4$ per ohm-cm. The conductivity can be altered either by changing the stoichiometry of the metal oxide (e.g. doping) or by forming a mixed metal oxide composite. Capacitors incorporating these materials have a specific capacitance of between 10 and 2000 F/g, preferably greater than 20 F/g, more preferably in the range of 30–800 F/g, and most preferably in the range of 100–800 F/g, depending upon the electrolyte and physical-chemical properties of the metal and mixed metal oxides used in the capacitor.

The invention is further summarized in that the electrochemical capacitor electrodes are formed in a sol-gel method, rather than an electrochemical or vacuum technique.

It is an object of the present invention to produce an electrode for an electrochemical capacitor that provides desirable charge and discharge properties, yet can be produced easily and inexpensively.

It is advantage of the present invention that the very high capacitance materials are also lightweight, thereby reducing the overall weight of cells incorporating these materials.

It is a feature of the present invention that the electrodes are formed in a straightforward sol-gel process.

It is another feature of the present invention that the inexpensive porous electrodes provide both very high surface area and attractive electrochemical properties which in combination result in a capacitor having capacitance properties comparable to or better than existing high-capacitance capacitors.

Other objects, advantages and features of the present invention will become apparent upon consideration of the following detailed description read in conjunction with the following drawings.

BRIEF DESCRIPTION OF THE SEVERAL VIEW OF THE DRAWINGS

FIG. 3a shows a substrate used in an embodiment of the present invention. FIG. 3b shows the dimensions of a packet formed by folding the substrate of FIG. 3a.

FIG. 5b is a capacitance plot of the capacitor of FIG. 5a.

FIG. 7b is a capacitance plot of the capacitor of FIG. 7a.

Figure 8A:
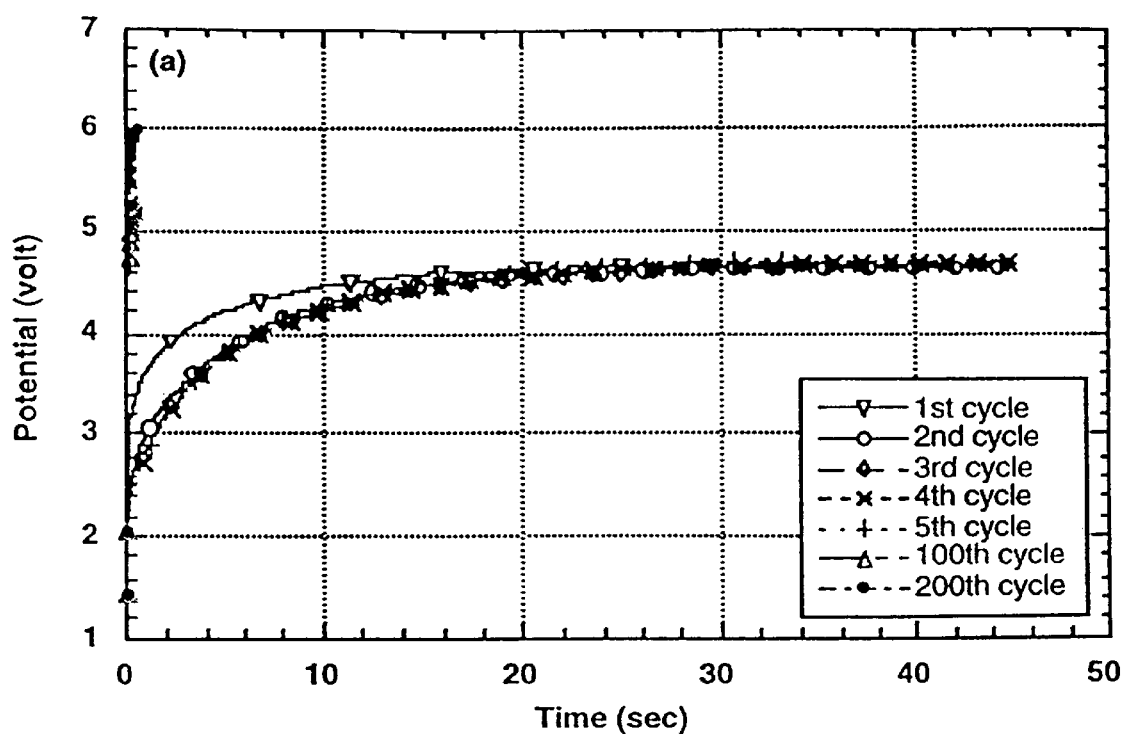
Figure 8B:
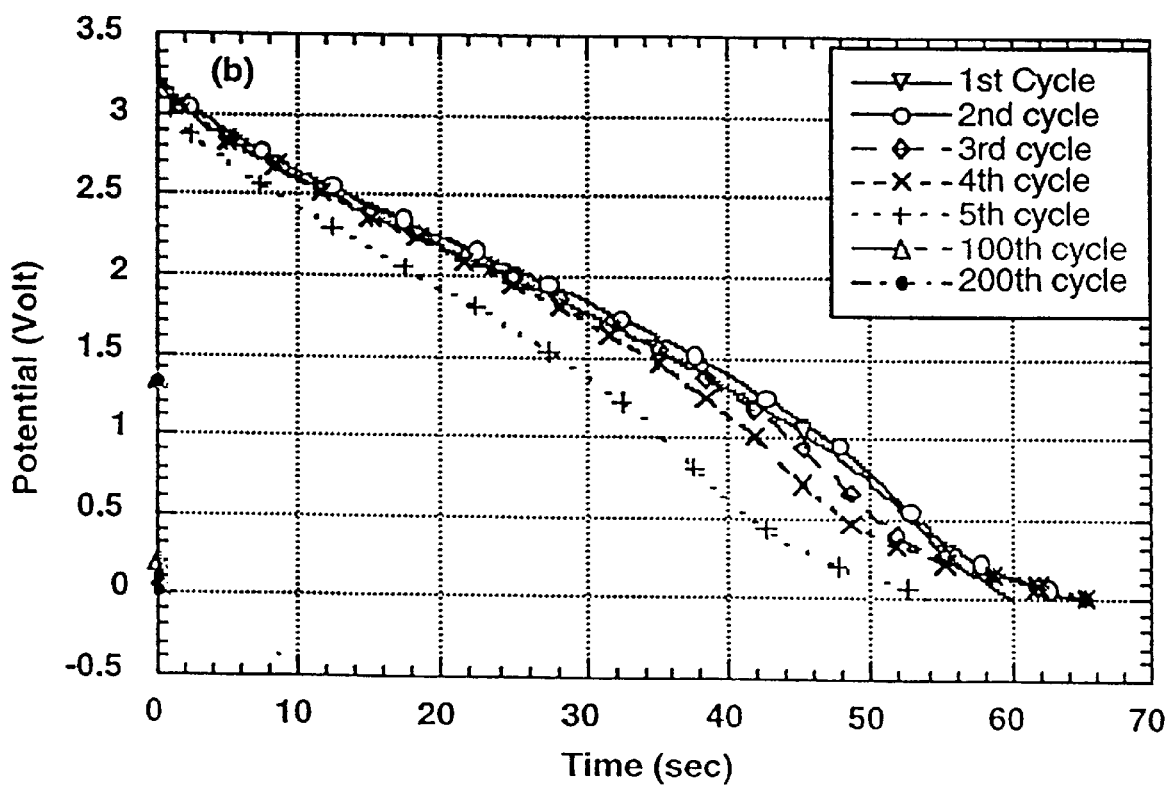

FIGS. 8a and 8b are charge and discharge curves, respectively, of a capacitor made in accordance with the present invention and containing a non-aqueous electrolyte. The charge current was 50 mA. This discharge current was 10 mA.

Figure 9A:
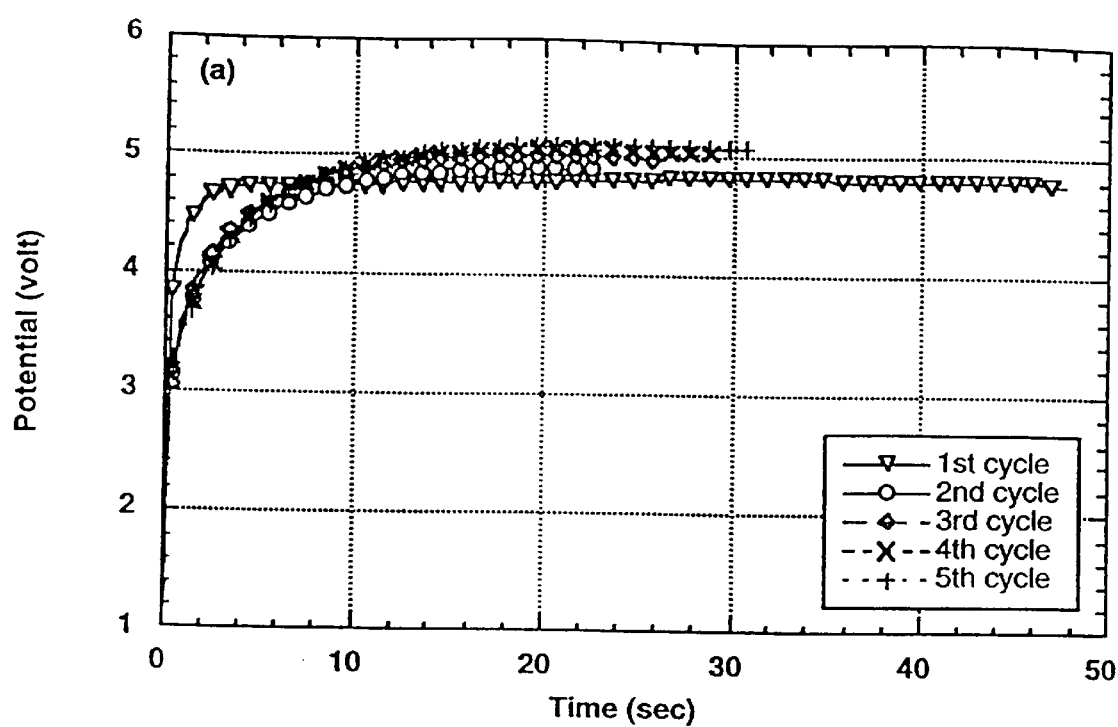
Figure 9B:
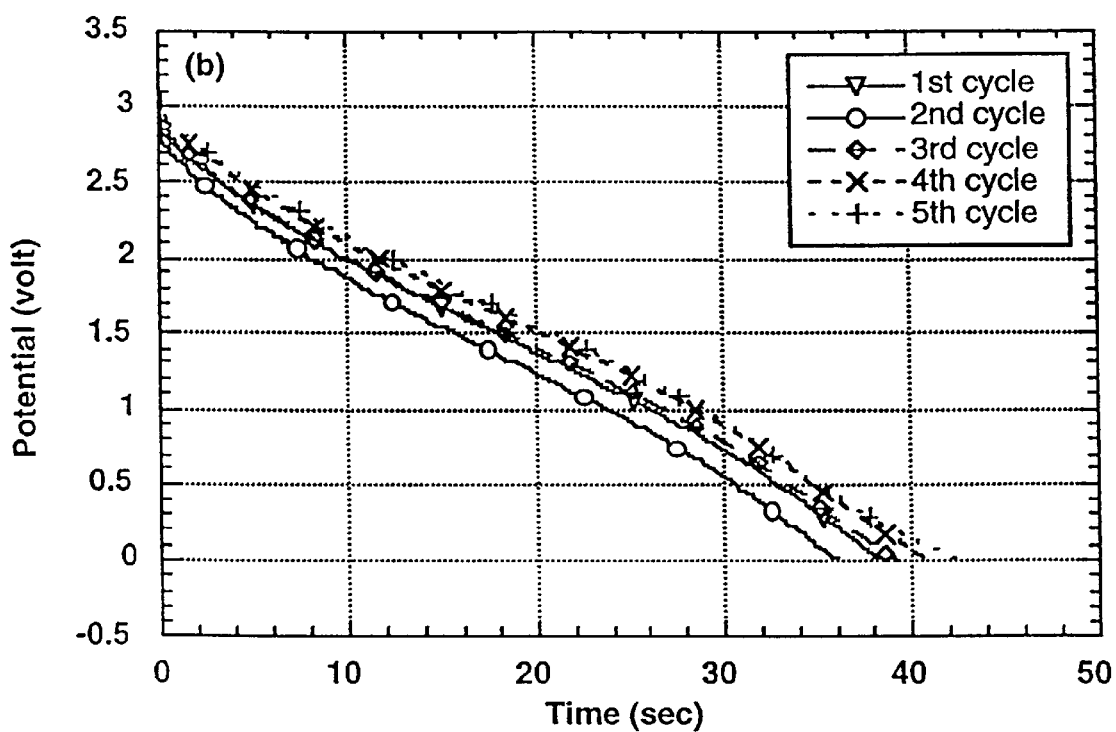

FIGS. 9a and 9b are charge and discharge curves, respectively, of the capacitor of FIGS. 8a and 8b, after replacing decomposed electrolyte solution. The charge current was 50 mA. The discharge current was 10 mA.

Figure 10:
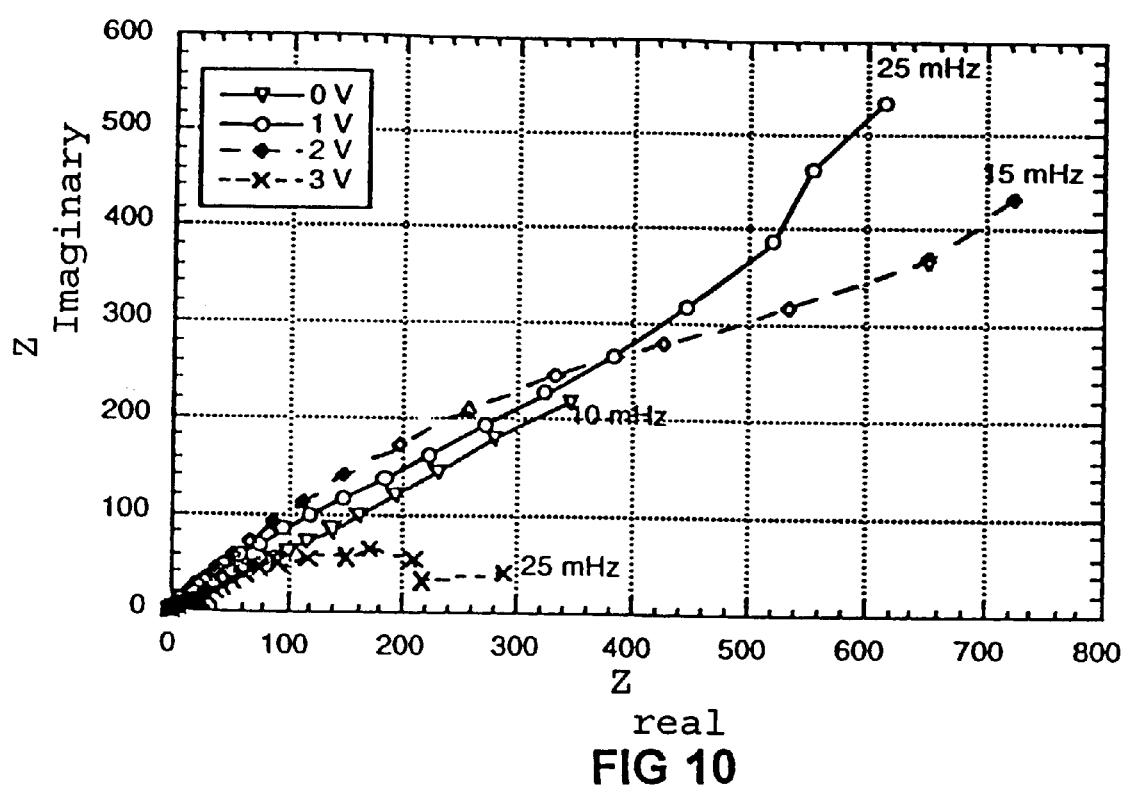

FIG. 10 is a Nyquist plot of a capacitor made in accordance with the present invention and containing non-aqueous electrolyte (1 M $LiClO_4$-PC).

Figure 11:
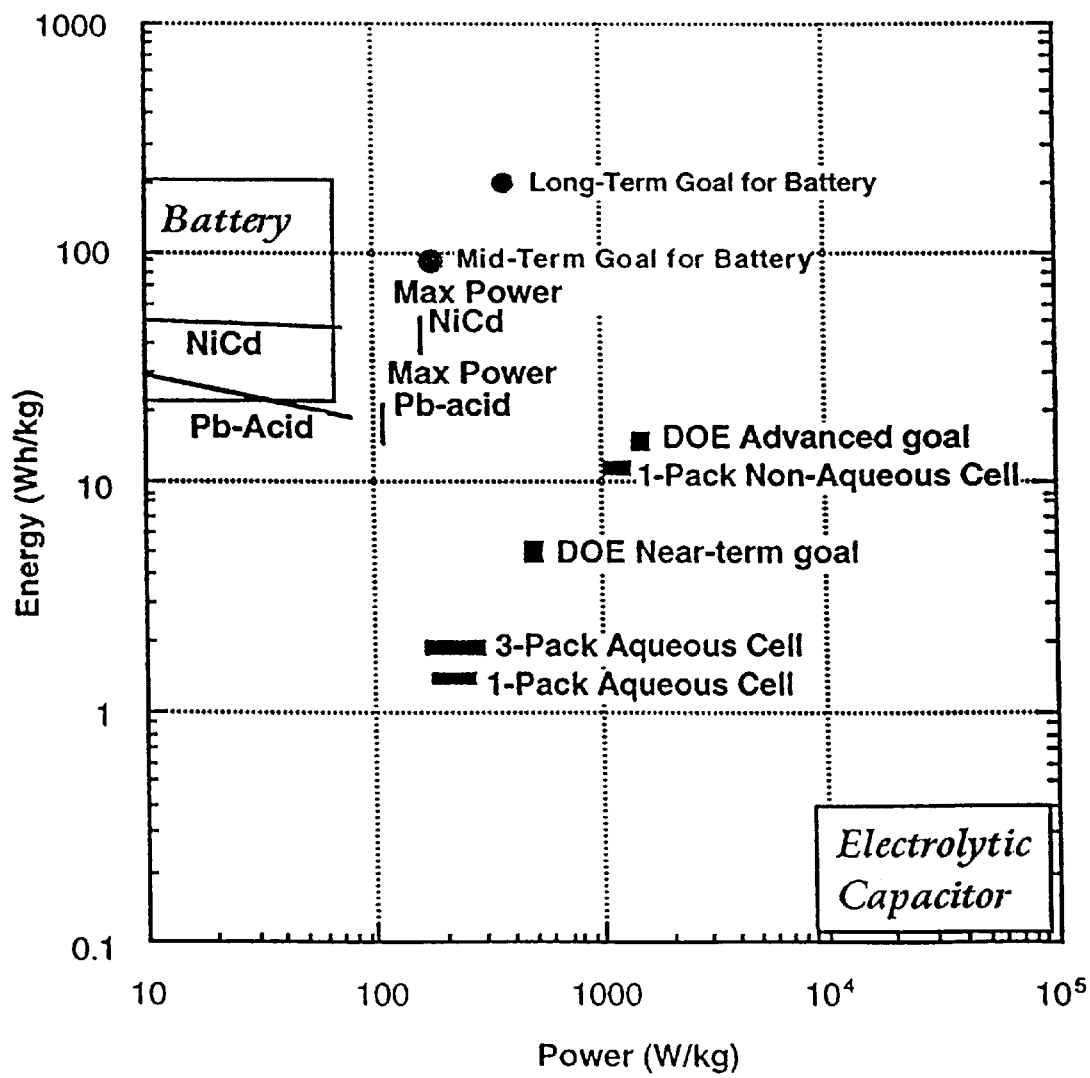

FIG. 11 is a Rogane plot of the power and energy of the prototypical capacitors of Example 3 and the relation of those devices to batteries and electrolytic capacitors.

DETAILED DESCRIPTION OF THE INVENTION

In one aspect, the present invention is a method for forming a high capacitance electrochemical capacitor electrode and, in another aspect, is an electrochemical capacitor electrode having the described properties. The invention also encompasses an electrochemical capacitor comprising an electrode of the present invention.

The use of nano-particles (primary particles of 2–100 nm, preferably 2–30 nm, in diameter; secondary particles of 4–1000 nm, preferably 10–150 nm, preferably 20–30 nm, in diameter, permits the formation of porous metal oxide electrodes having high surface area and proton (ion), or other ion (e.g., $Li^+$) adsorption or intercalation capability. In the nickel system described herein, the preferred ions are anions that can intercalate into the surface, in other metal systems, anions or cations may serve this purpose. These properties make these electrodes attractive for use in electrochemical capacitors that operate both as traditional electric double layer capacitors and as pseudocapacitors.

The oxide-based capacitors are produced using a sol-gel process like those described in U.S. Pat. Nos. 5,006,248; 5,096,745; 5,104,539, 5,169,576; and 5,227,342, all of which are incorporated herein by reference. As the patents describe, control over the rate of hydrolysis and condensation results in a macromolecular oxide network of controlled pore size and morphology. Since the porous metal oxide materials are formed at the molecular scale, mixed oxide systems that are homogeneous in the molecular range can be prepared. In this application, a "metal oxide" is intended to include, without limitation, materials comprising a single metal oxide, mixed metal oxides, a doped metal oxide, and a colloidal metal oxide/metal composite.

The metal or metal oxide sol from which the electrochemical capacitor electrodes are formed can be of any transition metal oxide or metal material having suitable electrochemical properties. It is intended that the capacitors can also include mixed oxide and doped oxide electrodes as well as pairs of anode/cathode electrodes prepared of different materials.

Suitable metal oxides for use in electrodes in the capacitors are characterized by small particle size, a porous structure, and suitable conductivity in the range of $10^{-5}$ per ohm-cm to $10^4$ per ohm-cm. The metal oxide electrodes formed from the materials should also have a high discharge rate, in keeping with understood standards for particular applications. The discharge rate is preferably about 99% discharge in 60 seconds or less (depending on the capacitance of the electrode). There should be no bulk or complete Faradaic reactions in the operating potential when the potential is applied to the electrode, otherwise high leakage current is observed. The electrode properties, especially the conductivity, can be modified by doping the metal oxides with other materials such as niobium, as is described in U.S. Pat. No. 5,028,568 (Anderson et al.), incorporated herein by reference.

The oxide choice will be also based upon: (1) suitability for sol-gel processing, (2) cost, as a bulk alkoxide (or other sol precursor), and (3) the capacitance possible per unit area when combined with a suitable electrolyte. Criterion (3) is expected to be similar to the capacitance measured for electrolyte/metal interfaces, about 10 to 30 microfarads per $cm^2$.

Conductivity requirements place a further restriction on materials selection, as some oxides are semi-conducting insulators, while others conduct nearly as well as metals. The conducting oxides include Ru, Rh, Mo, Mn, Ir, Os, Cr, Re, V, and W dioxides. Mn is considered a semiconductor, while the other dioxides are considered metallic conductors. The list below gives the bulk resistivity of each, along with that of metallic copper, for comparison:

| Dioxide | Resistivity (Ohm cm) |
| --- | --- |
| Cr | ~2 x $10^{-4}$ |
| Ir | ~4 x $10^{-5}$ |
| Mn | ~5 x $10^{-2}$ |
| Mo | ~1.5 x $10^{-4}$ |
| Os | 6 x $10^{-5}$ |
| Re | 1 x $10^{-4}$ |
| Rh | <1 x $10^{-4}$ |
| Ru | 4 x $10^{-5}$ |
| V | 3 x $10^{-4}$ (T > 341K) |
| W | 3 x $10^{-3}$ |
| Metallic Cu | 1.7 x $10^{-6}$ |

The crystalline phase of these materials include both a metal and a metal oxide. It is preferred that the metal oxide be non-stoichiometric. Non-stoichiometric is intended to mean that the anion:cation ratio in a metal oxide is not an exact integral value. For example, NiO can be made non-stoichiometric by doping with $Li^+$ which induces the presence of $Ni^{3+}$ and makes the ratio of Ni and O in NiO not exactly 1:1. In this way, the $Ni_xO$, where x is less than 1, can be made into a semiconductor. Iron oxide/iron may also be suitable and would be considered a preferred choice since it is very inexpensive. Many other transition metal oxides which are semiconductors are derived from the same mechanism. The non-stoichiometry of the transition metal oxides is closely related to oxygen partial pressure that the oxide grain has balanced. For example, the chemical reaction for introducing the non-stoichiometry into the nickel oxide system can be represented as ½ 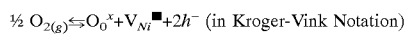 (in Kroger-Vink Notation)

½ 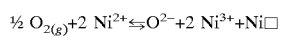

(where Ni☐ represents the nickel vacancy)

The amount of $Ni^{3+}$ ions, which is the main source for the non-stoichiometry in this case, is directly related to oxygen partial pressure. If the oxygen partial pressure is higher, the reactions will be driven to the right. More $Ni^{3+}$ ions can be formed at the NiO/air interface. All of the other transition metal oxides also show this oxygen pressure dependence, but the resulting multivalent ions may differ, depending on the defect types of the transition metal oxide. Due to this oxygen pressure dependence, the non-stoichiometric ions always segregate at the surface layer of the crystalline grains.

In this application, reference is made to a metal oxide/ metal thin film. This is intended to encompass metal oxide films that have been reduced such that some metal ions are present in the film. The presence of the metal facilitates transport of electrons, with little or no resistance, from the film surface to an underlying support. Such materials are also good candidates for lithium intercalation.

Regardless of the selected metal oxide to be formed in a sol-gel process, the starting material is typically an alkoxide of the selected metal. The choice of a suitable metal oxide depends upon a balancing of the desired electrochemical attributes and other considerations including cost and availability of starting materials. The current cost of alumina alkoxides is about $20/lb, much less than other metal alkoxides because they are currently in demand for investigation in a number of ceramic applications. This price could be reduced by about a factor of 10 if they became bulk commodity chemicals; this would bring other alkoxides (i.e., Mn) into a reasonable price range for bulk applications. While at present many alkoxides are either unavailable, or too expensive for use in making the required capacitor electrodes, there is a strong possibility that cheaper salts can be substituted for alkoxides or that bulk demand could reduce alkoxide prices dramatically. It is possible that chlorides, nitrates, acetates, or other salts of metals could be substituted for metal alkoxides, with adjustment to the production method to produce small particles from the salts.

The capacitors required for electric vehicle use are expected to weigh on the order of several 10's of kilograms, hence materials costs could be a significant factor in choosing an electrode oxide for capacitors used in electric vehicles. From the list above, conducting oxides of metals with reasonable costs include oxides of Cr, Mn, Fe, Si, Al, and Mo. These materials can also be doped or reduced as appropriate.

While methods for forming titanium oxide into a highly porous microstructure with high specific surface area are known, its low conductivity makes titanium oxide less attractive than other oxides that have been investigated. However, performance of titanium dioxide as an electrochemical capacitor could be improved by employing lithium intercalation and organic electrolytes.

Molybdenum seems well suited to electrode use, as it has a low resistivity (compared to Mn). The electrochemical properties and energy storage capabilities of molybdenum oxide appear to be better than the titanium oxide system. However, the chemistry of molybdenum is complicated by the fact that the reactant used to form molybdenum oxide is both expensive and hygroscopic, necessitating use of a dry box. Moreover, the leakage current is high when the normal operating potential (about 3–4 V) of an organic electrolyte is applied. Accordingly, organic electrolytes appear to be less useful in the molybdenum oxide system. $MoO_2$ retails for about $3/lb in commercial quantities. The cost of the bulk dioxide, however, is not the issue, as the base material could be an alkoxide, rather uncommon as a commodity chemical.

Even though it is a much poorer conductor than $MoO_2$, $MnO_2$ cannot be ruled out as an electrode material. The analysis shows that electrolyte resistance provides the greatest contribution to cell resistance, and even a poorly conducting oxide (like Mn) can perform well as an electrode. Manganese oxide can store charge by utilizing the redox reaction of $Mn^{4+}$. However, in capacitors, the redox reaction of manganese oxide may cause the leakage current to be very high and the discharge rate very low, thereby reducing its effectiveness as an electrochemical capacitor.

Nickel oxide has an acceptable specific capacitance and a small leakage current. The reactant used to form nickel oxide materials, nickel acetate, is cheap and stable in air. Therefore, nickel oxide is to be considered a preferred choice of metal oxide for use in the electrochemical capacitors of the present invention.

While it is preferable to use a commercially available metal alkoxide as a sol precursor, when none is commercially available it is possible to prepare an alkoxide from a precursor and then to hydrolyze and condense the alkoxide to make the sol. Conditions for preparing an appropriate metal oxide sol from an alkoxide precursor, and for controlling the properties thereof, are fully disclosed in the U.S. patents previously incorporated herein by reference.

A successful water-based method for forming a nickel oxide sol is as follows: Nickel acetate tetrahydrate is dehydrated in a constant temperature oven (about 100° C.). Ten grams of the dried powder are put into a 300 ml flask and the nickel acetate tetrahydrate is then hydrolyzed. In a preferred hydrolysis step, 120–300 ml of Milli-Q water is added to the powder and stirred for three days during which time hydrolysis occurs. The final appearance of the solution is green with a white precipitate. The green solution is separated from the white precipitate by centrifugation. The white precipitate is resuspended in a suitable amount of water. Depending upon the amount of water added, the solution can range from totally opaque to transparent. This white solution is the nickel oxide sol. When stored in a refrigerator, the sol is stable for at least ten days. At very low particle concentrations, the sol can be stable for several months. If precipitation occurs, the particles can readily be resuspended.

A second successful method for forming a nickel oxide sol is alcohol based. Suitable alcohols are low carbon number alcohols, such as ethanol and methanol. Nickel acetate tetrahydrate is dehydrated in a constant temperature oven (around 100° C.). Ten grams of the dried powder is put into a 200 ml flask and 120 ml of anhydrate alcohol is added. After two days of reaction in a reflux system at the boiling temperature of the alcohol, 3 ml of $H_2SO_4$ is added dropwise into the solution until the solution changes from opaque to transparent. One day later, the solution is removed and a LiOH-ethanol solution is added. At this stage, a white precipitate is observed. After two days of stirring, the precipitate separates from the green solution. The green solution, which is the sol, contains extremely small suspended particles which can be identified by laser beam.

The two methods thus described for preparing nickel oxide sols from an acetate precursor would also work with other transition metals, although adjustments understood to one of skill in the art may be needed to enhance the conductivity of materials formed from other metals.

The metal oxide sol prepared as described is coated onto a substrate or support. There are no geometric limitations to the substrate, because the porous material can be formed directly on this substrate surface by a number of processes including dipping, spinning, spreading, or other equivalent method. Therefore, it is comparatively easy to incorporate the sol-gel formation process into the manufacture of an electrochemical device. A suitable substrate design is one that gives a high surface area to volume ratio and is compatible with sol-gel coating methods. Supports as thin as 6μ have proven adequate to support thin film electrodes in the present invention, although thicker films can also work. The support can also be porous, such as porous nickel or reticulated carbon or carbon foam. Alternatively, the support can be a polished or unpolished thin metal mesh or foil, such as a nickel foil or aluminum foil. Foil substrates are preferred because they can be rolled into a small cylinder. The substrate can also be a conductive metal gauze (e.g., ASTM Mesh No. 200; Monel brand, available from McMaster-Carr, Chicago, Ill.) or a conductive polymer, which are advantageous because of their high surface area relative to a foil substrate. The substrate can include a contact for electrical connection to a device. The substrate also functions as a thermal sink. An aluminum substrate can be suitable as a thermal sink. The substrate can be coated with the sol several times, preferably by dipping, with drying but no firing between coating steps. The sol can be kept cool (e.g., 4° C.) during the coating process. Suitable dipping withdrawal speeds are about 0.5 to 5 mm/sec, although other speeds may work. Five or six coats are typical to obtain films of 300–350 nm thickness. Films of about 0.05 to 2μ on either side of the substrate are suitable, but thicker films may also be suitable (e.g., 2μ–5μ).

Figure 1:
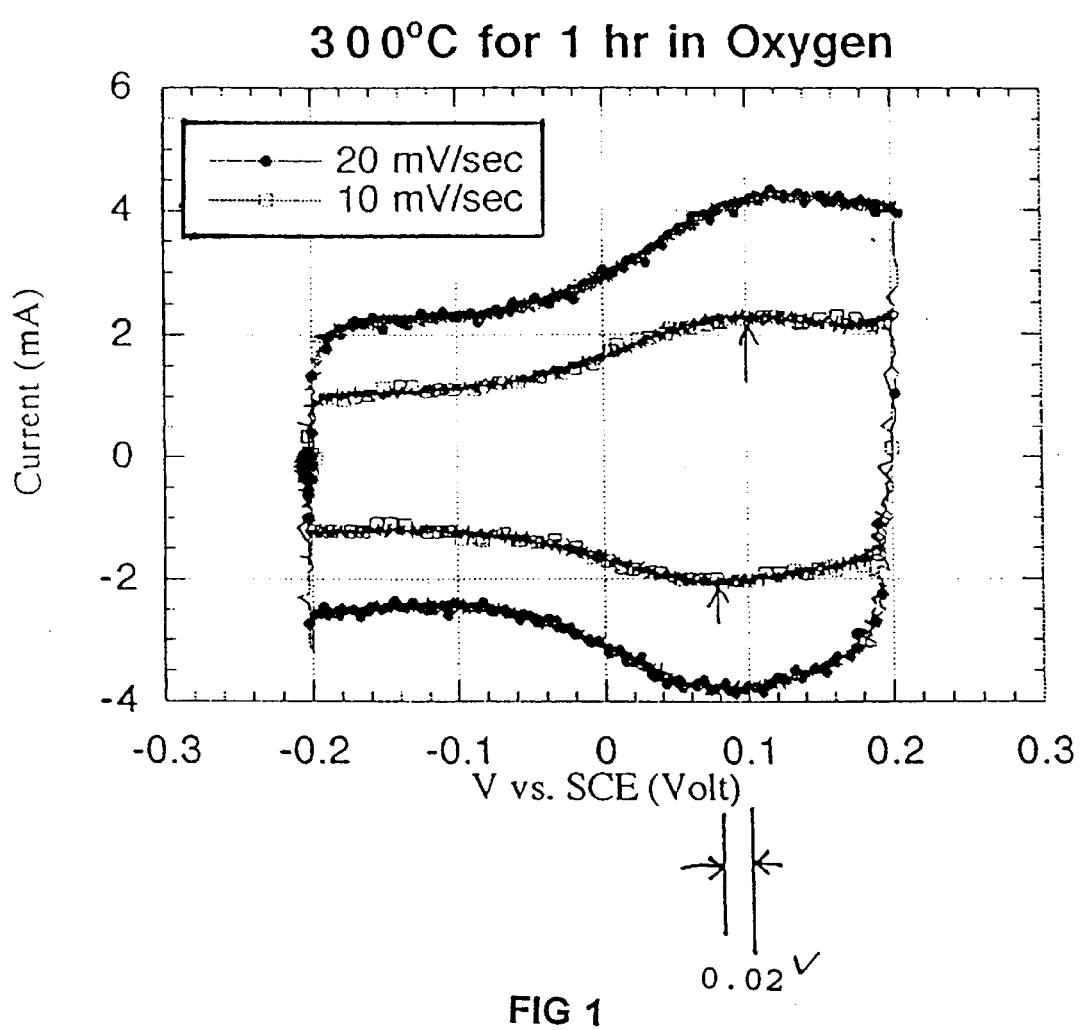
FIG. 1 is a cyclic voltammogram obtained using a nickel oxide porous electrode fired at 300° C. for one hour in an oxygen environment. The peak potential difference is 0.02 V.

After the substrate is coated with the sol, the coated substrate is dried and fired as described in the incorporated patents. The coated substrate is then fired for a suitable length of time at a temperature sufficiently high to calcine/sinter the xerogel/film into a metal oxide/metal ceramic material having the desired porosity and pore size. The inventors have determined that the firing environment is very important to determining the capacitance characteristics of electrochemical capacitors. Firing in air as opposed to oxygen or nitrogen results in nickel oxide materials having better electrochemical capacitor characteristics. Likewise, the inventors have also determined that an increase in firing time for nickel oxide samples fired in oxygen results in an increase in the irreversibility of the redox reaction in the positive potential. The irreversibility is defined as the difference of the peak potentials between the oxidation cycle and the reduction cycle. FIG. 1 shows a desirable square shape and demonstrates that the difference in peak potential under these conditions is 0.02 V. At two hours firing time, the difference was 0.35 V. At three hours, the difference was 0.41 V. At four hours, the difference 0.4V.

A suitable firing temperature is one that does not eliminate the surface area and porosity from the materials. Firing in the range of 200 to 1000° C. is acceptable and 300° C. is a suitable firing temperature for nickel oxide materials. For other metal oxides, the firing temperature can be readily determined by monitoring the pore characteristics of materials formed at various temperatures.

Figure 2:
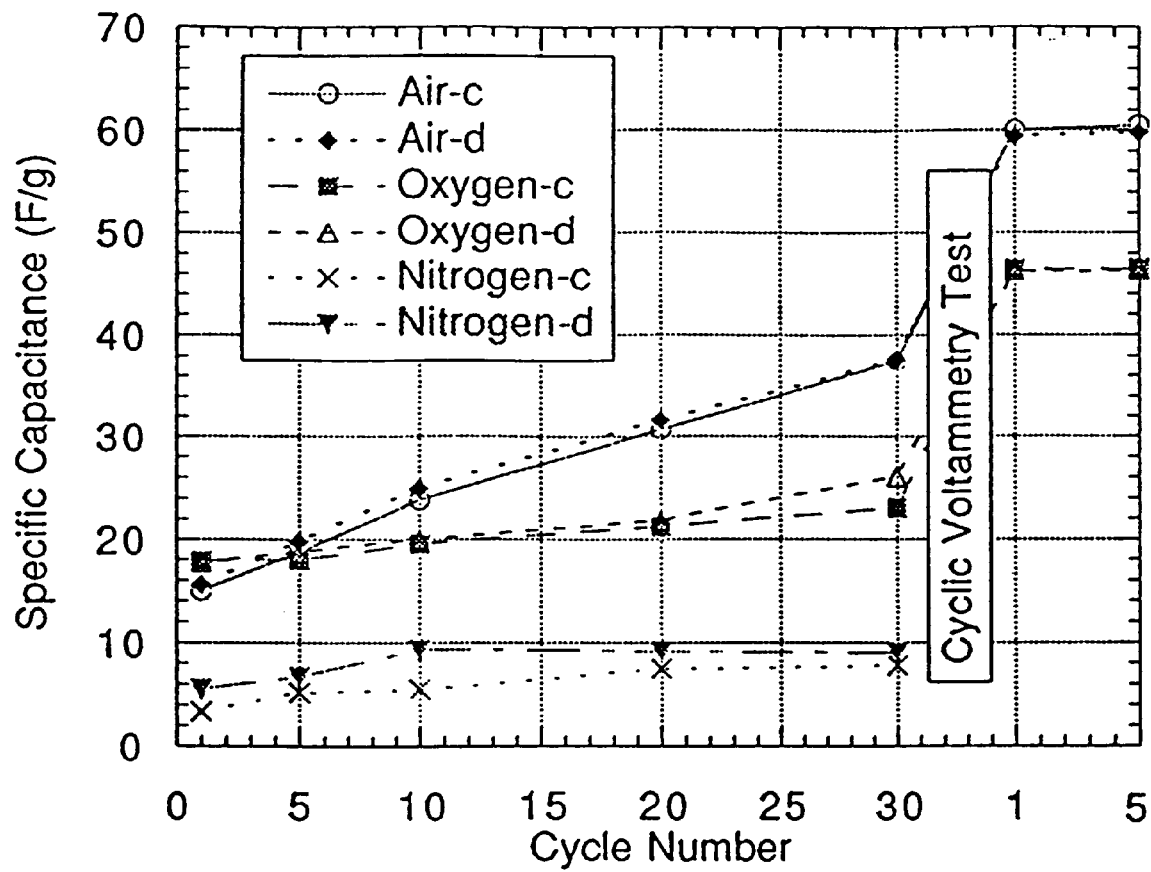
FIG. 2 is a graph that shows the effect of firing time on specific capacitance of a nickel oxide electrode.

It is important to fire the materials in a suitable atmosphere that enhances the non-stoichiometry of the oxide. The atmosphere can include an oxidizing agent (e.g., oxygen) or a reducing agent (e.g., hydrogen) or an inert gas (argon, helium, nitrogen), as appropriate. Reduction can occur in the presence of an inert gas, with residual carbon atoms from the precursor molecules acting as a reducing agent. The inventors have shown (FIG. 2; after 30 cycles, same samples subject to cyclic voltametry test; five extra cycles were performed after cyclic voltametry) a 25% increase in specific capacitance (F/g) when nickel oxide materials are fired at 300° C. in air rather than in oxygen. For example, firing in air for 1 hour yielded about 60 F/g specific capacitance (in an aqueous electrolyte) as opposed to about 46 F/g when fired in oxygen, and much lower when fired in nitrogen. Accordingly, for nickel oxide at least, firing at 300° C. for one hour in air is preferred.

The electrolyte used in conjunction with the porous metal oxide capacitor of the present invention can be aqueous or non-aqueous. Aqueous electrolytes can only sustain up to about 1–2 V of potential before electrochemical decomposition of water occurs. This can be overcome by arranging individual capacitors in parallel or by using non-aqueous electrolytes which can withstand up to 3–4 V of applied potential. It is also possible to modify the capacitance by adjusting the electrolyte concentration.

A suitable non-aqueous electrolyte is an organic or non-aqueous solvent containing an ion that can intercalate into the electrode surface. The ion can be an anion or cation, depending upon the metal oxide/metal system used. A $Li^+$-containing ionic electrolyte, such as a 1M solution of $LiClO_4$ in anhydrous propylene carbonate, is preferred in a nickel oxide/nickel system. Use of a non-aqueous electrolyte can be advantageous in that ion intercalation occurs, sustaining an even higher potential and increasing the energy density of the system, although a higher internal resistance and decreased conductivity may also result. Lithium can be added in an amount sufficient to intercalate at all available intercalation sites. These nano-particulate materials are well suited for intercalation because they have extremely high surface activity and high surface area, both of which contribute to high surface free energy which facilitates intercalation by, for example, lithium.

Other non-aqueous or organic electrolytes are also suitable if they meet the following criteria: (1) the applied potential at which the electrolyte decomposes ("breakdown voltage") is between 1V and 10V, (2) the conductivity of the electrolyte is sufficiently high to facilitate rapid electron transfer between electrodes, preferably in the range of 0.1 to 1000, preferably 0.1 to 500, milliSiemens/cm, and (3) the electrolyte has low or no ability to chelate the metal or to extract the metal from the thin film surface. The electrolyte should chelate or remove less than 5% and preferably less than 1% of the metal from the film surface.

Suitable aqueous electrolytes include KOH, LiOH, or a mixed electrolyte of KCl/LiOH. All electrolytes can be provided in aqueous solutions at 1M total electrolyte. KCl and LiCl, while generally suitable, are less preferred since they provide a low (about 8 F/g) and constant (not increasing) capacitance over many charge/discharge cycles, presumably because of a shortage of available $OH^-$ ions, which appear to play a major role in inducing surface redox reactions on the thin-film electrodes of the present invention.

Unsupported films made from the sol and fired at various temperatures and under various environments can be evaluated to determine their properties, and, therefore, the properties of electrodes incorporating the sols. The resulting materials are characterized by any of a number of methods including transmission electron microscopy, atomic force microscopy, and x-ray diffractometry. The results indicate that when these films are fired about 300° C., they retain a highly porous structure (mean pore size of between 5 and 200 Å (0.5–20 nm), preferably 15–50 Å) and a fine grain size (2–100 nm, preferably 2–50 nm, depending upon the firing temperature). These fired films have the same crystal structure as nickel (II) oxide.

One can evaluate the capacitance and cyclic voltametry of these materials in a suitable test cell. A pair of test electrodes are spaced apart in a cell containing an aqueous or non-aqueous electrolyte. The separation between the two electrodes can be 100μ or more, but is preferably in the range of 0.5μ to 10μ, and is more preferably 0.5μ to 5μ. The separator can be a non-conducting material such as a polymer or a metal oxide insulating film. Multiple electrodes can be spaced apart from one another. A potential step is applied to a circuit in which the cell and a 100 Ω resistor are connected in series. An IBM-AT computer with a Keithley DAS-8 A/D converter card can be used to sample the potential drop across the 100 Ω resistor every 20 ms while charging and across the cell while discharging. The computer reports the potential drop across the resistor vs. time. The potential is converted into current by Ohm's law and the discharge curve and charge curve are integrated numerically. The integrated values equal the total charge stored or released from the test cell. The total charges divided by the applied potential equal the capacitance of the test cell. From the capacitance, the energy storage and power delivered to a constant load, and average power are readily calculable using standard equations that are well known and understood.

Preliminary data indicated average capacitance of nickel oxide films prepared as described to be between 10 and 30 F/g, without optimization (especially of firing conditions). Specific powers and specific energies for these samples were about 300–2000 W/kg and 2–4 W-hr/kg, respectively. Cyclic voltammograms indicated that the electrochemical reactions that occur in these capacitors can easily be altered by changing the conditions employed in processing these materials. It is anticipated that improvements in these values will be realized by altering the electrode preparation conditions including the starting materials, pH and concentration of the sol precursors, and the reaction time. Indeed, subsequent embodiments, particularly those employing organic electrolytes with lithium, have yielded specific power of 1200 W/kg, a specific energy of 11.85 W-hr/kg, and a volumetric energy density of 16.9 W-hr/liter. These values exceed the U.S. Department of Energy near-term development goal for ultracapacitors and are close to meeting the long term goal for these energy storage systems. It is expected that the present invention can achieve specific power as high as 1600 W/hr/kg and specific energy as high as 15 W-hr/kg. The materials of the present invention function best after several cycles, during which more multi-valent ions (e.g., $Ni^{3+}$) can be induced by the applied potential. After an initial start-up time (several cycles) the materials are capable of fully reversible cycling.

The specific capacitance of these materials can be improved by varying the ratio of the oxide and metal phases, the ratio of $Ni^{2+}$ and $Ni^{3+}$ ions, the microstructure of the material, or the concentration or nature of the electrolytic solution.

The invention will be further understood upon consideration of the following examples, which are intended to be illustrative of the invention, but not limiting thereon.

EXAMPLES

1. Preparation and Analysis of Nickel Oxide Gel

Nickel oxide sol was prepared from nickel (II) acetate tetrahydrate according to both the water-based and ethanol-based methods described above.

The transformation of nickel acetate tetrahydrate while heating can be expressed as below:

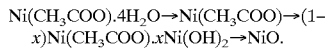

The transformation of nickel acetate tetrahydrate has previously been studied in air and in a vacuum. In air, the starting material is dehydrated at 95° C. and is decomposed into NiO between 160 and 230° C. Under vacuum, the dehydration temperature is 80° C., and intermediate forms at 195° C. and decomposition occurs at between 275 and 300° C. with the final product of NiO and Ni. Baraldi, "Thermal Behavior of Metal Carboxylates: III—metal acetates," *Spectrochimica Acta* 38A:51–5 (1982).

The Thermogravimetric analysis (TGA) and Differential Thermal Analysis (DTA) of the nickel acetate tetrahydrate and dried nickel acetate tetrahydrate (under air flow and nitrogen flow) were determined. For the nickel acetate tetrahydrate, the first weight loss occurs at 100° C. and the second at around 350° C. The first weight loss is the dehydration of nickel acetate tetrahydrate. The second weight loss is the transition to intermediate compounds and the final nickel oxide with the decomposition of the organic group. For the dried nickel acetate tetrahydrate, the weight loss from dehydration is less and dehydration temperature shifts to 210° C. The major weight loss from the phase transition still occurred around 350° C. This shows that the nickel acetate tetrahydrate has been dehydrated.

The TGA and DTA of a dried unsupported gel formed from a sol made according to the water-based method show that the dehydration occurred at 100° C. At 250° C., an endothermic reaction (in both air and nitrogen environments) is observed at the beginning of a major weight loss. Just before the weight loss ends, another reaction which is exothermic in air and endothermic in nitrogen is seen. The reaction at 250° C. may be the decomposition of the basic salt of nickel ($Ni(OH)_2$ or NiOOH). The subsequent reaction is similar to the reaction of nickel acetate tetrahydrate and may be the decomposition of the organic group.

The TGA and DTA of a dried unsupported gel made from a sol prepared according to the ethanol-based method shows that dehydration occurred at 100° C. The endothermic reaction at 210° C. is the decomposition of bonded OH. The reactions between 300° C. and 400° C. can be explained as the decomposition of an organic group (acetate or ethyl).

Unsupported xerogels made from sols prepared according to either the water-based method or the ethanol-based method were examined by x-ray diffractometry. When the sol was synthesized by the water-based method, the unsupported xerogel fired in air below 200° C. was amorphous. Above 300° C. the xerogel shows the presence of NiO and Ni. If the xerogel prepared from a sol made according to the ethanol-based method is fired in argon at 400° C., the crystalline phase is Ni.

From these data it is apparent that when a xerogel, prepared according to either method, is fired in a reducing atmosphere, only Ni results. To obtain NiO, firing in air is necessary.

The specific surface area of unsupported nickel oxide xerogels made from sols prepared according to both methods was measured by nitrogen adsorption and analyzed by BET. For the water-based sol preparation method, the highest surface area is obtained at 200° C., but the crystalline phase appears only after firing at temperatures above 300° C. Thus, the firing temperature at 300° C. is a preferred choice for making samples. Because higher specific surface area is attained from samples from sols prepared according to the water-based method, this method is to be considered the preferred method.

TABLE 1

Specific surface area of nickel oxide system

| Firing Condition | Specific Surface area of unsupported gel made from Method 1 ($m^2/g$) | Firing condition | Specific surface area of unsupported gel made from Method 2 ($m^2/g$) |
|---|---|---|---|
| Unfired* | 167.3 | 150° C. in air | 22.03 |
| 200° C. in air | 364 | 250° C. in air | 14.8 |
| 300° C. in air | 142.2 | 350° C. in air | 37.5 |
| 400° C. in air | 96.6 | 500° C. in air | 15.6 |

*Heated at 100° C. for 1 hour during de-gas procedure in BET measurement.

A nickel oxide sol prepared according to the water-based method was coated onto a nickel grid by dipping and Transmission Electron Microscopy (TEM) samples were fired at various temperatures and atmospheres. These samples were observed under a TEM (JEOL 200 CX) at 200 kV. The microstructure of these gels is porous and is composed of small particles. The particle size increases as firing temperature increases. The particle size of samples fired at 300° C. is about 5 nm. A similar NiO/Ni film coated on mica and observed by AFM shows particle sizes in the same range.

The reaction of nickel acetate tetrahydrate to NiO sol was studied using infrared spectroscopy between 640 and 4000 $cm^{-1}$. The nickel acetate tetrahydrate, dried nickel acetate tetrahydrate, the reaction product of the nickel acetate and ethanol, and the unsupported xerogel were all evaluated. The structure of nickel acetate tetrahydrate is changed after being dried in the oven, as evidenced by multiplex peaks in the range of 1200–1600 $cm^{-1}$. Hydroxyl (OH) group vibration is found at 3565 $cm^{-1}$. After reaction with ethanol, only the ratio of intensity from acetate and hydroxyl groups change. The xerogel shows highly bonded OH groups on nickel ion structure at 3645 $cm^{-1}$. Bukovec, P. et al., "Thermal Analysis of Nickel Oxide Films," *J. Thermal Analysis* 40:1193–6 (1993) indicated that the hydroxide stretching vibrations occur at 3638 and 3640 $cm^{-1}$ for 4 $Ni(OH)_2$. $NiOOH.5.78H_2O$ and $Ni_3O_2(OH)_4.1.53H_2O$ respectively. The peak at 3645 $cm^{-1}$ indicates an OH stretching vibration on the nickel ion. However, even in the xerogel, the acetate is still present. That is, the hydrolysis of nickel acetate is not complete. The nickel sol product is actually a mixed compound of nickel with acetate and hydroxide.

Nickel oxide sols prepared according to the water-based method were coated on both sides of nickel foils (thickness=125 microns before polishing) by dipping with a drawing speed of 22.2 cm/min. Two sets of samples with different thicknesses were made and tested. The manufacturing conditions and properties of these samples are listed below.

TABLE 2

| Substrate | Thin samples polished nickel foil | Thick samples unpolished nickel foil |
|---|---|---|
| Concentration of power:water (volume ratio) | ~1:500 | ~1:10 |
| Dipping and firing cycles | 4 | 2 |
| Firing temperature and time | 300° C. 1 hr in air | 300° C. 1 hr in air |
| Total surface area of active material | 5.76 $cm^2$ | 5.58 $cm^2$ |
| Total weight of active material | 0.6 mg | 2.5 mg |
| Thickness measured by AFM) | ~120 nm | ~350 nm |

The surface morphology of these prepared samples were observed by atomic force microscopy. In addition to being thicker, the thick sample also has larger particle (grain) size and greater surface roughness. The surface roughness (RMS) of the thin sample and the thick sample were 22 nm and 75 nm, respectively.

The thin films were fixed in a parallel spaced-apart position. A suitable distance between the films is 7 mm. Several cyclic voltammograms of the thin and thick samples were prepared. These data demonstrated that the nickel oxide films have a double-layer capacitance as high as existing ruthenium dioxide materials. When the potential is higher than 0.3 volt vs.SCE, the water begins to decompose. These measurements were made in 1 M KOH.

A 30 cycle test was performed on the thick samples. The thick samples have larger specific capacitance than the thin samples, 24 F/g versus 9 F/g. This may indicate that the thickness of the active materials can play an important role in this material system, although this is not true in the $RuO_2$ system. Since the particle size and surface roughness of the thick samples are larger than those of the thin samples, the correlations between these parameters and capacitance need to be investigated in a systematic way. The specific capacitance of the thick sample increased with increasing cycle number until it reached a saturation value. This is different than the thin sample. The increase in specific capacitance may come from the gradual wetting of interporosity of the thick samples. These transport limitations are probably not observed in the thinner samples.

When the charge and discharge occurs of these samples were measured, an irregular shape was observed on the first few cycles, with the discharge and charge curves becoming relatively uniform after 10 cycles. The charge and discharge curves can be fitted by an RC model in which charge and discharge curves show exponential decay. Compared with $MnO_2$ the charge curve of nickel oxide has lower leakage current and the discharge curve of nickel oxide has no apparent shoulder. This seems to indicate that a complete Faradaic reaction in the bulk of the material does not occur in nickel oxide, but rather, only surface Faradaic reactions are major contributors to charging in the high surface area nanoparticulate materials.

Impedance measurements were performed on the thin samples. The thin samples were soaked in water after a 200 cycle test for about 3 days. An impedance analyzer (HP4192) was used to measure the impedance of the samples at various potentials from 1–10 V over various frequencies from 1 mHz to 10 KHz. The shape of the impedance curve for the nickel oxide electrode is quite similar to that which can be described by the porous model of the carbon electrode and the surface redox reaction model of the $RuO_2$ electrode.

From these tests on the nickel oxide electrodes, the inventors conclude that the nickel oxide is a very good material to apply as an active material in an electrochemical capacitor. Specific capacitance comparable to the $RuO_2$ electrode is obtained at significantly lower expense.

The effect of surface roughness, grain size, morphology, and substrate and metal oxide thickness on specific capacitance is not yet fully determined. The phases of the nickel oxide and the ratio of $Ni^{2+}$ and $Ni^{3+}$ ions may also affect the specific capacitance. These properties are readily investigated by adjusting, for instance, the roughness of the substrate surface, the drawing rate at which sol is coated onto the substrate, firing condition, firing atmosphere, and sol concentration. It is anticipated that optimized results can be obtained by adjusting these variables and evaluating the resulting electrocapacitor materials using the tests described herein.

It is also important to investigate the hydrolysis of nickel acetate at higher pH values to determine whether fully hydrolyzed nickel acetate can be achieved. However, if the $OH^-$ ion is released too fast, the nickel hydroxide will precipitate. Slow release of $OH^-$ is possible using dialysis.

Nickel (II) oxide is a p-type semiconductor. The conduction mechanism is based on the transport of holes. The conductivity is proportional to the hole concentration that is a function of the concentration of the $Ni^{3+}$ ions. By doping lithium ions into the nickel (II) oxide lattice, the concentration of nickel (III) ions and hole concentrations can be increased. Hence, doping can increase the conductivity of nickel (II) oxide. By this process, about 10 weight percent lithium ion can increase the conductivity of the mixed nickel/nickel oxide from $0.000001$ $S \cdot CM^{-1}$ to $1$ $S \cdot CM^{-1}$, the conductivity of pure nickel oxide. In the electrochemical capacitor, it is possible either to increase the conductivity of nickel oxide by doping or to increase the matrix conductivity by adding metal colloids to the nickel oxide sol. Lithium-doped nickel oxide can be made by hydrolysis of lithium isopropoxide and nickel methoxide. Alternatively, a gold colloid can be used to increase conductivity. Here a gold colloid could be mixed with nickel oxide sol. As a mixture of gold and nickel oxide, the interconnected particles should enhance the conductivity of the film.

Two important parameters for a capacitor are its specific energy and specific power. Due to the limitation of applied potential on electrochemical capacitors in aqueous electrolyte, the single cell design for an electrochemical capacitor is not practical. Usually, a bipolar design is used in carbon-based and $RuO_2$-based capacitors. A bipolar design, putting several single cells in series can sustain higher applied potentials and can increase the stored energy. Other designs for electrochemical capacitors are also possible, such as a spiral wound capacitor. By rolling the thin film substrate electrodes coated with thin insulating oxide separating films, the surface/volume ratio can be increased. It is also possible to use metal gauze or carbon foams as a substrate to further enhance the surface/volume ratio, because these materials have higher surface areas than a plate for the same weight of material. By utilizing the specific capacitance of nickel oxide, an optimized design of a nickel oxide-based electrochemical capacitor can be obtained.

2. Electrolyte Tests $Ni_xO/Ni$ thin films were coated to a thickness of 0.3–0.4 microns on a 0.125 mm thick Ni foil and were tested as described herein for specific capacitance in various electrolytes containing $OH^-$ ions. Films immersed in 1M LiOH had the highest specific capacitance, 265 F/g, while films in 1M KOH had a specific capacitance of 130 F/g. A mixed electrolyte (0.5M KCl/0.5M LiOH) provided a specific capacitance of 170 F/g.

The specific capacitance of identical thin films tested in a 1M $LiClO_4$ solution of anhydrous propylene carbonate (non-aqueous) electrolyte system also showed reasonable charge storage capability. At an applied potential of 1V, the specific capacitance was about 44 F/g. At 3.5V, the specific capacitance was about 26 F/g. At 4V, the specific capacitance was about 36 F/g. Although the capacitance was the highest at 1V and was a function of applied potential, the energy density was higher at 3.5V to 4V, which provided the best operating conditions.

In the example using the non-aqueous electrolyte, 4V of applied potential yields a cell capacitance of 18 F/g and an energy density of 144 kJ/kg (40 Whr/kg), based on active material. At 3.5V, the cell capacitance of 13 F/g and an energy density of 22.1 Whr/kg. Thus, non-aqueous electrolytes are very attractive alternative electrolytes for these ultracapacitors.

XPS/ESCA analysis of the films used in this Example revealed that immersion in an aqueous electrolyte did not change the surface elemental composition (Ni, C, O) of the film. When films that had been immersed in 1M KOH were tested, negative electrodes showed a lower $Ni^{3+}/Ni^{2+}$ ratio than the positive electrode. Also, the negative electrode contained less O—Ni(II) than did the positive electrode. Both facts suggest that the $Ni^{3+}/Ni^{2+}$ ratio plays an important role in the charge storage mechanism. When films that had been immersed in 1M LiOH were tested, the positive electrode contained almost no $Ni^{2+}$ on the surface, indicating that LiOH is more reactive than KOH.

When films that had been immersed in non-aqueous electrolytes were evaluated, the electrodes again showed distinct $Ni^{3+}/Ni^{2+}$ ratios. Also, the bonding nature of oxygen in the negative electrode appeared to have been altered, relative to non-immersed films. On the basis of observed binding energies, it is believed that the alteration results from lithium intercalation into the nickel oxide matrix, and that this intercalation can also serve as a pseudocapacitative charge storage mechanism in a non-aqueous solution.

In summary, the oxidation state varied with different electrolyte solutions. In both KOH and LiOH systems, the amount of $Ni^{3+}$ ions increased after electrochemical testing, while in 1M KCl solution the $Ni^{3+}/Ni^{2+}$ ratio remained almost the same. This suggests that the $OH^-$-containing aqueous electrolytes can change the surface oxidation state of the surface Ni atoms and the ratio of these atoms during electrochemical testing. LiOH changes the ratio on both electrodes more than KOH, thereby providing higher specific capacitance in this LiOH system.

Non-aqueous electrolyte systems display completely different results. Where lithium is intercalated into the lattice, oxygen binding patterns in the negative electrode are altered, while the positive electrode displays the same characteristics as untested nanocrystalline $Ni_xO$ thin-films.

3. Single- and Multiple-Pack Capacitor Tests

Thin nickel foil substrates (6 um, Alfa, 99.95%) were cut into the shape shown in FIG. 3(a). The average weight of each piece was in the range of 0.08 to 0.09 grams. The foil substrates were then cleaned in a acetone bath for 10 minutes and subsequently sonicated in a Milli-Q water bath for another 10 minutes. These foils were then coated with nickel oxide suspensions prepared as described herein. A dip-coating process was used and was performed at a withdrawal speed of 1 mm/sec. Each foil was subjected to a six-coating cycle sequence without intermediate firings. The coated foils were fired in an air environment using a tube furnace rampled to 300° C. at a rate of 1° C. per minute, held for 1 hour, and ramped down to room temperature at a ramping rate of 1° C. per minute.

The final assembly was produced by folding two of these coated and fired foils, which were separated with a Celgard® microporous membrane (Hoechst Celanese, 3501, 20 um thick, PP base) into a rectangular shape with a dimension of 6 cm×5 cm. This folded double electrode assembly was then placed into a plastic pouch, filled with electrolyte solution, and sealed with a proper arrangement of tabs for electrical contact. The dimensions of each single package is shown in FIG. 3(b). The total thickness was about 0.45 mm (including the pouch and all of the material inside the pouch).

Three cells were fabricated for testing. The first was a single package cell with 0.7 M LiOH (Aldrich, 98+%) as the electrolyte solution. The second was also a single package cell with 1 M LiClO$_4$ (Aldrich, 95+%)-propylene carbonate (Aldrich, 99+%, anhydrous) as the electrolyte. The third device was a multiple package containing three individual bipolar cells are placed in series. In this later case, each cell is filled with 0.6 M LiOH. The weight of the active material for all of these cells is listed in Table 3.

TABLE 3

Mass of nickel oxide thin films in each prototype ultracapacitor.

| Cell No. | 1 | 2 | 3 | | | | Total |
|---|---|---|---|---|---|---|---|
| Single-Pack (Aqueous) | 10 mg | 7.9 mg | — | — | — | — | 17.9 mg |
| Single-Pack (Non-Aqueous) | 12.5 mg | 11.5 mg | — | — | — | — | 24 mg |
| 3-Pack (Aqueous) | 15.5 mg | 20.9 mg | 14.8 mg | 15.5 mg | 11.1 mg | 9.7 mg | 87.5 mg |

A potentiostat (EG&G, PAR 6301) was employed to characterize these cells using constant current charge and discharge methods (Chronopotentiometry in EG&G M270 software) as well as impedance analysis (EG&G M398 software). In the case of the aqueous cell, two current values, 5 mA and 10 mA, were chosen for the charge and discharge tests in order to establish the dependence of cell performance (capacitance and power) on charge/discharge rates. The non-aqueous cell was charged at 50 mA and was discharged at 10 mA.

Capacitance was obtained from charge and discharge curves using a least-square best fit method. Although the performance of these cells may involve two processes each having its own time constant (as characterized from impedance analysis), this linear least-square fit provides an average capacitance and allows properties to be easily compared.

The energy was obtained from the equation:

$$E = \frac{1}{2}CV^2$$

and the power was calculated from the discharge curve following the equation:

$$P = VI = I/t \int_0^t V(t) dt$$

Figure 4:
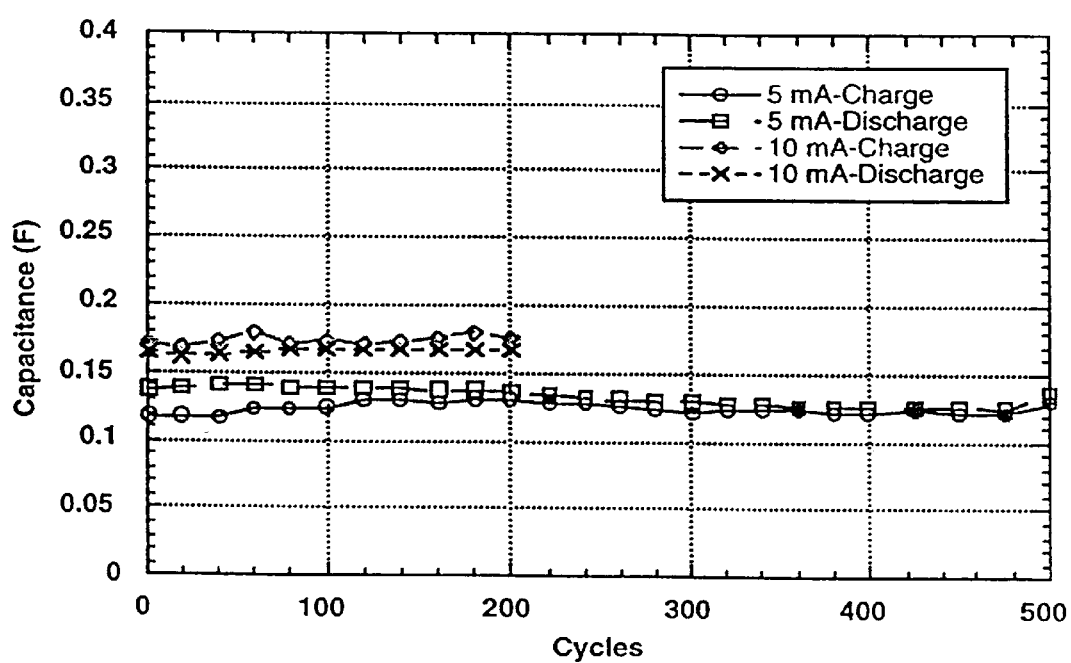
FIG. 4 is a plot of the capacitance of a 3-pack capacitor made in accordance with the present invention, where three individual bipolar cells operate in series, and containing an aqueous electrolyte.

The energy and power of the cell were divided by the total weight of active material to obtain specific energy and power values for these devices. The volumetric density value was calculated based upon the assumption that the active film has a thickness of 300 nm. FIG. 4 shows the long-term stability of the 3-pack model where good stability exists over 500 cycles. Furthermore, this cell was used for all of the tests described in this example, thereby increasing this number to at least 700 cycles without sacrificing capacitance. The specific capacitance of the material in the 3-pack is around 75 F/g which is roughly one third of the specific capacitance obtained from a small size sample. This suggests that the manufacturing process during scale-up can be, and should be, further optimized. The energy density of this 3-pack cell based on the total weight of active material is about 1.9 W-hr/kg. The power density of this cell is about 300 W/kg at 2 seconds and 161 W/kg at 20 seconds of discharging. In terms of volumetric energy density, it is about 4.2 W-hr/liter. Although this device did not meet the near-term goal for the development of electrochemical capacitors set by DOE (5 W hr/kg and 500 W/kg) on a weight basis, its performance is similar to active carbon systems which employ aqueous electrolytes.

Figure 5A:
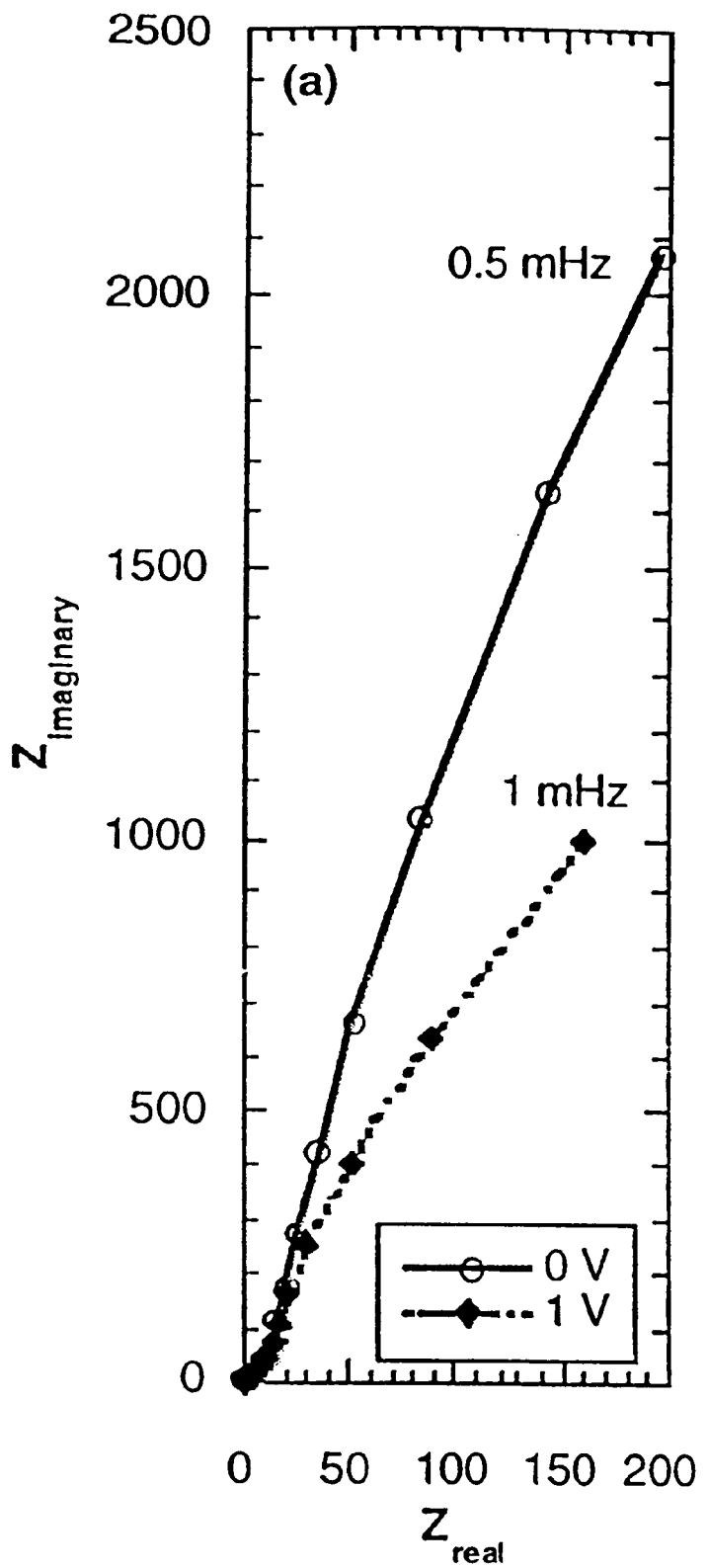
FIG. 5a is a Nyquist plot of the 3-pack capacitor with aqueous electrolyte at two applied potentials (units=ohms).
Figure 5B:
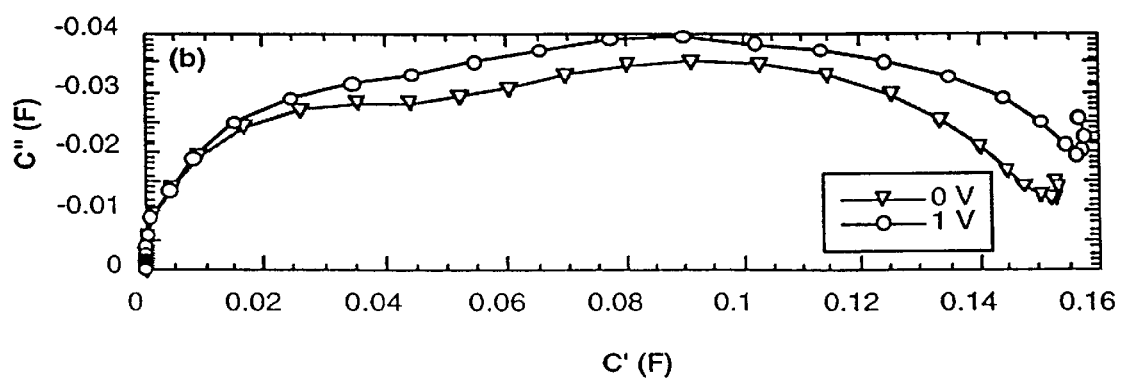

FIG. 5(a) shows a Nyquist plot of the 3-pack module under different applied potentials. The internal resistance obtained from $Z_{real}$ vs. Frequency and $Z_{imaginary}$ vs. Frequency was around 0.9 Ω at 1.58 kHz. The capacitance plots ($C_{real}$ vs. $C_{imaginary}$) from these conditions show two semicircles, as illustrated in FIG. 5(b). The diameter of each semi-circle varies with applied potential. These two semi-circles imply that there may be two processes, having two time constants, which are governing the performance of this device. The contribution of each process varies with the applied potential. Future modeling of this device is planned in order to help elucidate the electrochemical and transport mechanisms controlling this phenomena.

Figure 6:
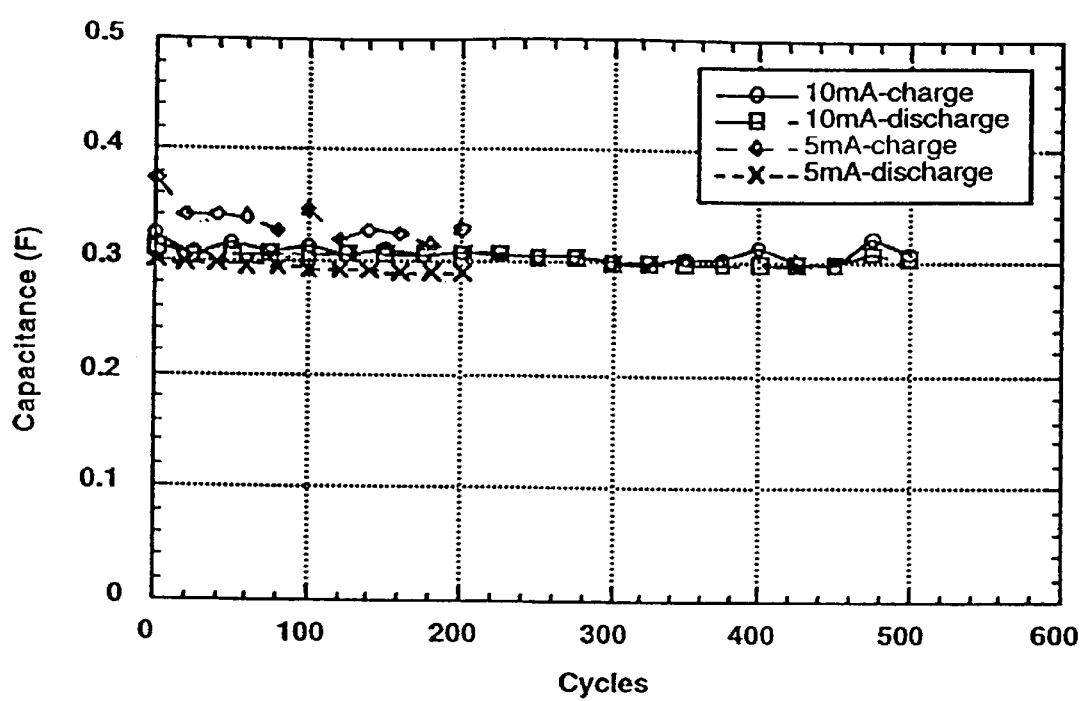
FIG. 6 is a plot of capacitance of a single-pack capacitor made in accordance with the present invention and containing aqueous electrolyte.

FIG. 6 shows the results obtained from a long-term stability test on a single-pack cell containing an aqueous electrolyte. It also shows a very stable performance over all cycles up to 700 cycles. The energy density of this single package cell is slightly smaller than the 3-pack cell, due to its lower potential range. While charging, this system can sustain up to 1.5 volts, but it releases charge at 0.7 volts as observed from the discharge curve. This low potential range causes the energy density of this cell to fall to 1.2 W-hr/kg. The power density was 230 W/kg at 10 seconds of discharging. In terms of volumetric energy density, this single-pack aqueous electrolyte cell provides 1.3 W-hr/liter. The specific capacitance of the material calculated from this cell is only 68 F/g which is around one third of the capacitance obtained from small (2 cm×2 cm) electrodes. These numbers, similar to those above for the 3-pack module, can be significantly improved by optimizing the thin-film depositional process as well as by improvements in supporting materials.

Figure 7A:
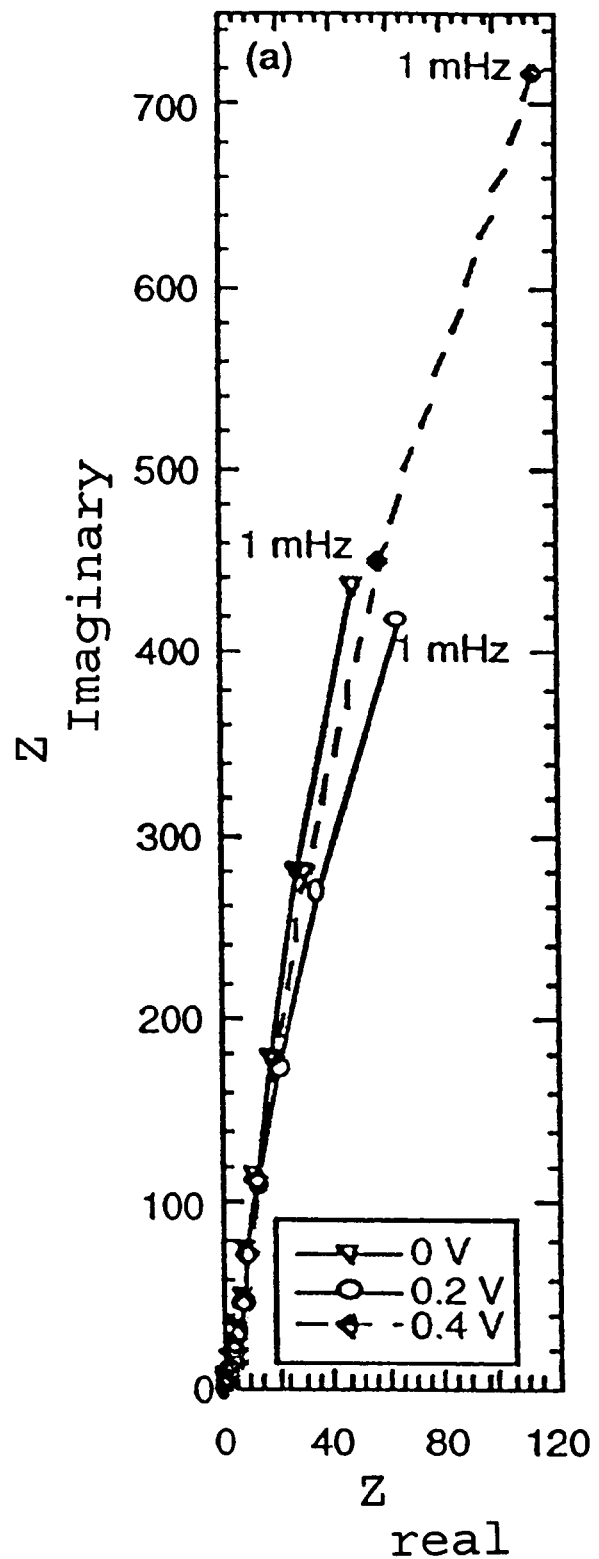
FIG. 7a is a Nyquist plot of the single-pack capacitor with aqueous electrolyte at two applied potentials (units=ohms).
Figure 7B:
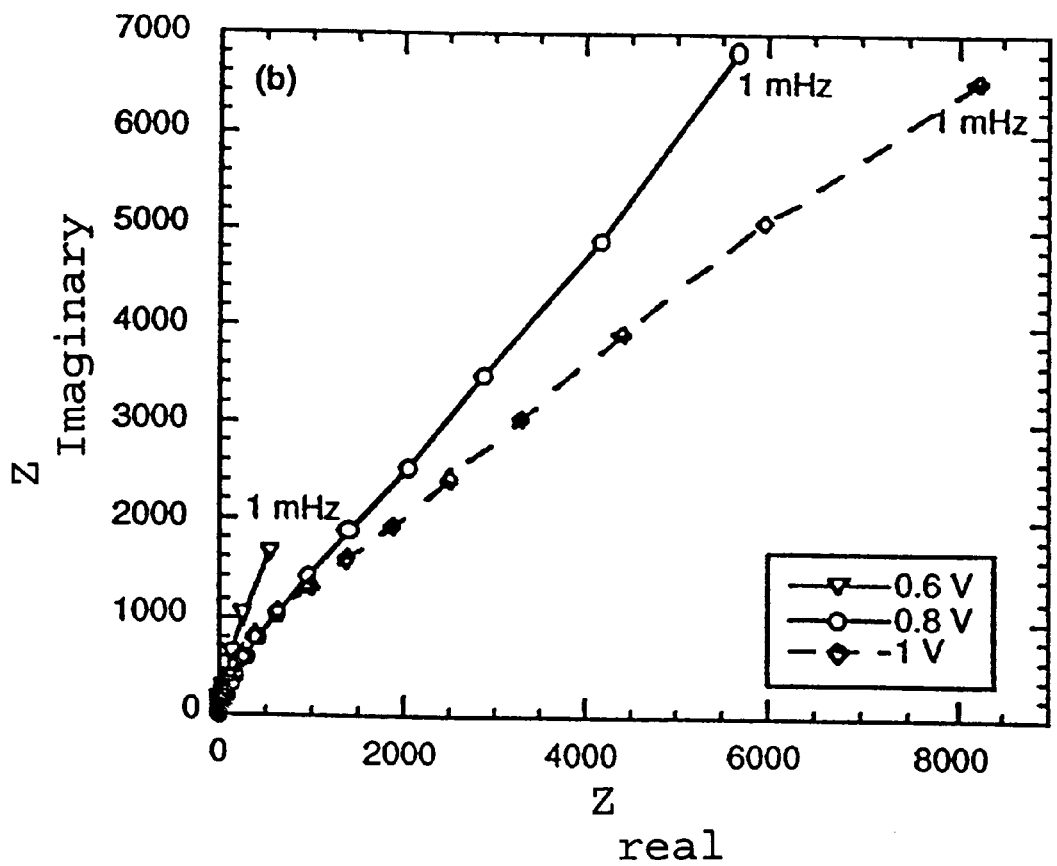

The Nyquist plot of this single package (FIG. 7) also shows the similar potential dependance feature found above for the three-pack cell. The internal resistance in this case was smaller because there was only one cell. The value is around 0.15 Ω at 250 Hz (when applied potential is 0 to 0.4 volts). The capacitance plots ($C_{real}$ vs. $C_{imaginary}$) of this cell can also be fit with two semi-circles. The diameters of the semi-circles also vary with the applied potential.

Lastly, the performance of a non-aqueous single-pack device is shown in FIGS. 8(a) and 8(b). The charge storage mechanism of the NiO electrochemical capacitors using non-aqueous electrolyte system relates to a lithium intercalation reaction. Unfortunately, the reaction takes place at high potentials (around 4 volts or above). This high potential exceeds the decomposition window of the solvent used for the tests described here. Because of this limitation, it was difficult to obtain stable performance for this system.

However, from the first 20 cycles (this number depends on how long the solvent has suffered damage from the effects of overcharging), some interesting properties of this system were observed that provide an indication as to the ultimate performance of this device with a non-aqueous electrolyte that operates stably above 4 V.

FIGS. 8a and 8b show the charge and discharge curves of this system for the first five, the 100th and the 200th cycles. No capacity was obtained from this device after 100 cycles. In order to prove that this degradation in performance was caused by damage to the electrolyte and not to the electrode material, part of the electrolyte was replaced with a fresh solution. Because a certain amount of the solution is contained in the porous microstructure of the film, only a part of the decomposed solution could be expelled. After expelling as much of the solution as possible and re-injecting fresh solution into the cell, performance returned to normal. This is shown in FIGS. 9 and 9b which illustrate that during the first five cycles, this regenerated cell performs like the original. This implies that the decomposition of solvent was the major cause of the problem. Table 4 compares the specific quantities of this cell in its original and regenerated states. We believe that minor differences result from the remaining degraded solution which we are not able to completely extract from the cell.

TABLE 4

Specific properties of ultracapacitor using non-aqueous electrolyte solution.

| Sample | Capacitance (Farad) | Discharge starting potential (V) | Energy density (W-hr/kg) | Power density (W/kg) (at 10 sec) | Volumetric energy density (W-hr/liter) |
|---|---|---|---|---|---|
| Original | 0.2 | 3.2 | 11.85 | 1224 | 16.9 |
| Regenerated | 0.15 | 3.2 | 8.9 | 1058 | 12.7 |

As commonly happens in non-aqueous electrochemical capacitors, this cell has a higher internal resistance than the aqueous cell. The resistance is around 0.5 Ω at 10 kHz as obtained from impedance analysis. Nyquist plots for this cell also prove to be a function of applied potential in FIG. 10. The plots have different shapes as compared with their aqueous counterparts and therefore should be represented by different equivalent circuits when attempting to model these systems. The capacitance plots only show a segment of the semicircle.

The best energy density calculated from the discharge curve of this cell is around 11.85 W-hr/kg. The power density is 1070 W/kg at 25 sec. and 1200 W/kg at 10 sec of discharging. The volumetric energy density is 16.9 W-hr/liter. As illustrated in FIG. 11, the energy density and power density of this device exceed the near-term goal and almost meet the long-term goal (15 W-hr/kg and 1600 W/kg) of the Department of Energy (6). The volumetric density exceeds the DOE goal (11 W-hr/liter) by 5.9 W-hr/liter. Therefore, this device is a very attractive ultracapacitor candidate.

The present invention is not intended to be limited to the preceding embodiments, but rather is to encompass all such variations and modifications as come within the scope of the appended claims.

We claim:

1. An electrochemical capacitor comprising an anode and a cathode, the anode and the cathode comprising:

an electrode substrate;

a porous coating on the substrate, the coating comprising a metal oxide and having a surface area of greater than 30 m$^2$/g, a porosity in the range of 10 to 80%, a mean grain size between 2 and 100 nm, and a mean pore size of between 0.5 and 20 nm; and an electrolyte in contact with the coating, wherein the metal oxide comprises an anion and a cation in a non-stoichiometric ratio.

2. An electrochemical capacitor as claimed in claim 1 wherein the coating is selected from a group consisting of a single metal oxide, a mixed metal oxide, a doped metal oxide, and a metal oxide/metal composite.

3. An electrochemical capacitor as claimed in claim 1 wherein the metal oxide is selected from a group consisting of nickel oxide, silica, titania, aluminum oxide, iron oxide, molybdenum oxide, manganese oxide, ruthenium oxide, rhodium oxide, iridium oxide, osmium oxide, chromium oxide, rhenium oxide, vanadium oxide and tungsten oxide.

4. An electrochemical capacitor as claimed in claim 1 wherein the metal oxide is nickel oxide.

5. An electrochemical capacitor as claimed in claim 1 wherein the electrolyte comprises an intercalating ion.

6. An electrochemical capacitor as claimed in claim 5 wherein the intercalating ion is lithium.

7. An electrochemical capacitor as claimed in claim 1 comprising a separator in contact with the porous coating.

8. An electrochemical capacitor as claimed in claim 7 wherein the separator comprises a material selected from the group consisting of a non-conducting polymer and a metal oxide insulating film.

9. An electrochemical capacitor as claimed in claim 1 having a specific electrochemical capacitance between 10 and 2000 F/g.

10. An electrochemical capacitor as claimed in claim 1 having a conductivity between $10^{-5}$ per ohm-cm and $10^4$ per ohm-cm.

11. An electrochemical capacitor formed according to a process comprising the steps of:

coating onto a pair of electrode substrates a sol comprising metal oxide colloidal particles of between 2 and 100 nm in diameter;

drying the sol onto the substrates to form a xerogel;

firing the xerogel in an atmosphere at a temperature that does not destroy the porous microstructure of the xerogel, for a time sufficient to yield on the substrates a porous metal oxide material that comprises an anion and a cation in a non-stoichiometric ratio, the material having a surface area of greater than 30 m$^2$/g, a porosity in the range of 10 to 80%, a mean grain size between 2 and 100 nm, and a mean pore size of between 0.5 and 20 nm, to form a pair of electrodes; and immersing the electrodes into an electrolyte.

12. An electrochemical capacitor as claimed in claim 11 wherein the atmosphere comprises a gas selected from the group consisting of an oxidizing gas, a reducing gas and an inert gas.

13. An electrochemical capacitor as claimed in claim 11 wherein the firing temperature is between 200 and 1000° C.

14. An electrochemical capacitor as claimed in claim 11 wherein the electrolyte is selected from a group consisting of a non-aqueous electrolyte and an aqueous electrolyte.

15. An electrochemical capacitor as claimed in claim 11 wherein the electrolyte comprises an intercalating ion.

16. An electrochemical capacitor as claimed in claim 15 wherein the intercalating ion is lithium.

17. An electrode comprising:

an electrode substrate;

a porous coating on the substrate, the coating comprising a metal oxide that comprises an anion and a cation in a non-stoichiometric ratio, the coating having a surface area of greater than 50 m²/g, a porosity in the range of 10 to 80%, and a mean pore size of between 0.5 and 20 nm.

18. An electrode as claimed in claim 17 wherein the substrate is selected from a group consisting of a foil, a foam, and gauze.

19. An electrode as claimed in claim 17 wherein the substrate comprises a material selected from the group consisting of aluminum, nickel, and a conductive polymer.

20. An electrode as claimed in claim 17 wherein the metal oxide comprises nickel oxide.

21. An electrochemical capacitor consisting of:

a pair of electrode substrates;

a porous coating on the substrates, the coating comprising a metal oxide that comprises an anion and a cation in a non-stoichiometric ratio, the coating having a surface area of greater than 30 m²/g, a porosity in the range of 10 to 80%, a mean grain size between 2 and 100 nm, and a mean pore size of between 0.5 and 20 nm; and an electrolyte in contact with the coating.

* * * * *

UNITED STATES PATENT AND TRADEMARK OFFICE
CERTIFICATE OF CORRECTION

PATENT NO.   : 5,963,417
DATED        : October 5, 1999
INVENTOR(S)  : Marc A. Anderson, Kuo-Chuan Liu and Charles M. Mohr It is certified that error appears in the above-identified patent and that said Letters Patent is hereby corrected as shown below:

Column 1,
Line 18, insert

-- STATEMENT REGARDING FEDERALLY SPONSORED RESEARCH OR DEVELOPMENT

The United States has certain rights in this invention pursuant to Contract No. DE-AC07-94ID13223 between the U.S. Department of Energy and Lockheed Martin Idaho Technologies Company. This invention was also made with United States Government Support awarded by the following agencies:
    DOE Grant No.: C87-101251-KF-126-91; and
    U.S. Department of Commerce, NOAA Grant No.: NA46RG0481. --

Signed and Sealed this

Twentieth Day of August, 2002

Attest:

Attesting Officer

JAMES E. ROGAN
*Director of the United States Patent and Trademark Office*